(12) United States Patent
Liu et al.

(10) Patent No.: US 11,528,571 B1
(45) Date of Patent: Dec. 13, 2022

(54) MICROPHONE OCCLUSION DETECTION

(71) Applicant: Amazon Technologies, Inc., Seattle, WA (US)

(72) Inventors: Ian Ernan Liu, Shenzhen (CN); Carlo Murgia, Santa Clara, CA (US); Huiqun Han, Shenzhen (CN); Zhouhui Miao, Saratoga, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/150,599

(22) Filed: Jan. 15, 2021

(51) Int. Cl.
| H04R 29/00 | (2006.01) |
| G10L 25/21 | (2013.01) |
| G10L 25/51 | (2013.01) |
| H04R 3/00 | (2006.01) |
| G10L 15/22 | (2006.01) |
| H04R 1/40 | (2006.01) |
| G10L 25/18 | (2013.01) |

(52) U.S. Cl.
CPC .......... H04R 29/005 (2013.01); G10L 15/22 (2013.01); G10L 25/18 (2013.01); G10L 25/21 (2013.01); G10L 25/51 (2013.01); H04R 1/406 (2013.01); H04R 3/005 (2013.01)

(58) Field of Classification Search
CPC .................................................... H04R 29/00
See application file for complete search history.

(56) References Cited

U.S. PATENT DOCUMENTS

| 11,044,567 B1 * | 6/2021 | Li ........................... G10L 25/51 |
| 11,115,766 B1 * | 9/2021 | Sinelnikov ............. G08B 21/18 |
| 11,234,089 B2 * | 1/2022 | Yan ....................... H04R 29/004 |
| 2015/0304786 A1 * | 10/2015 | Partio ................... H04R 25/305 |
| | | 381/58 |

* cited by examiner

*Primary Examiner* — Olisa Anwah
(74) *Attorney, Agent, or Firm* — Pierce Atwood LLP

(57) ABSTRACT

A system configured to perform microphone occlusion event detection. When a device detects a microphone occlusion event, the device will modify audio processing performed prior to speech processing, such as by disabling spatial processing and only processing audio data from a single microphone. The device detects the microphone occlusion event by determining inter-level difference (ILD) values between two microphone signals and using the ILD values as input features to a classifier. For example, when a far-end reference signal is inactive, the classifier may process a first ILD value within a high frequency band. However, when the far-end reference signal is active, the classifier may process the first ILD value and a second ILD value within a low frequency band.

18 Claims, 19 Drawing Sheets

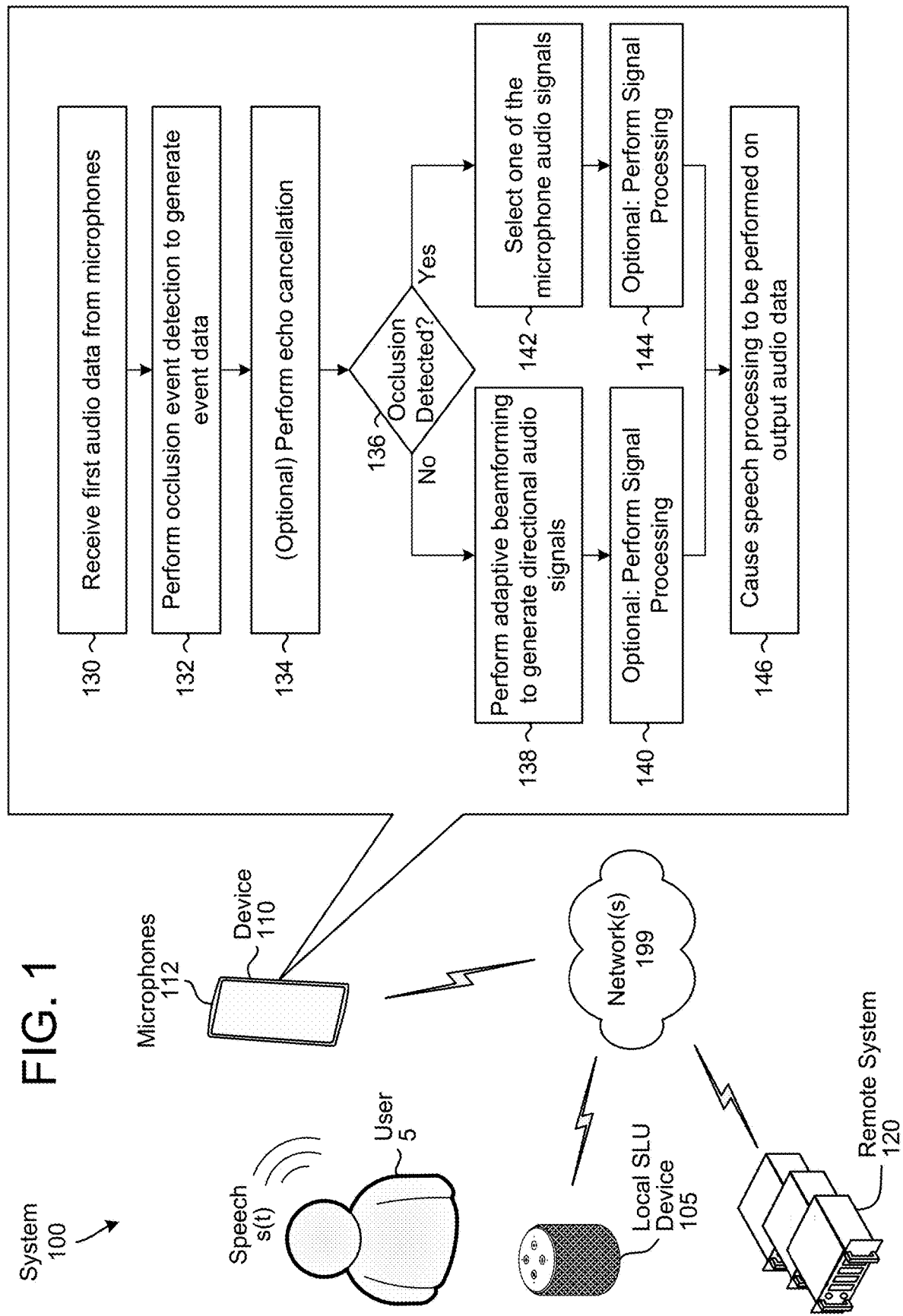

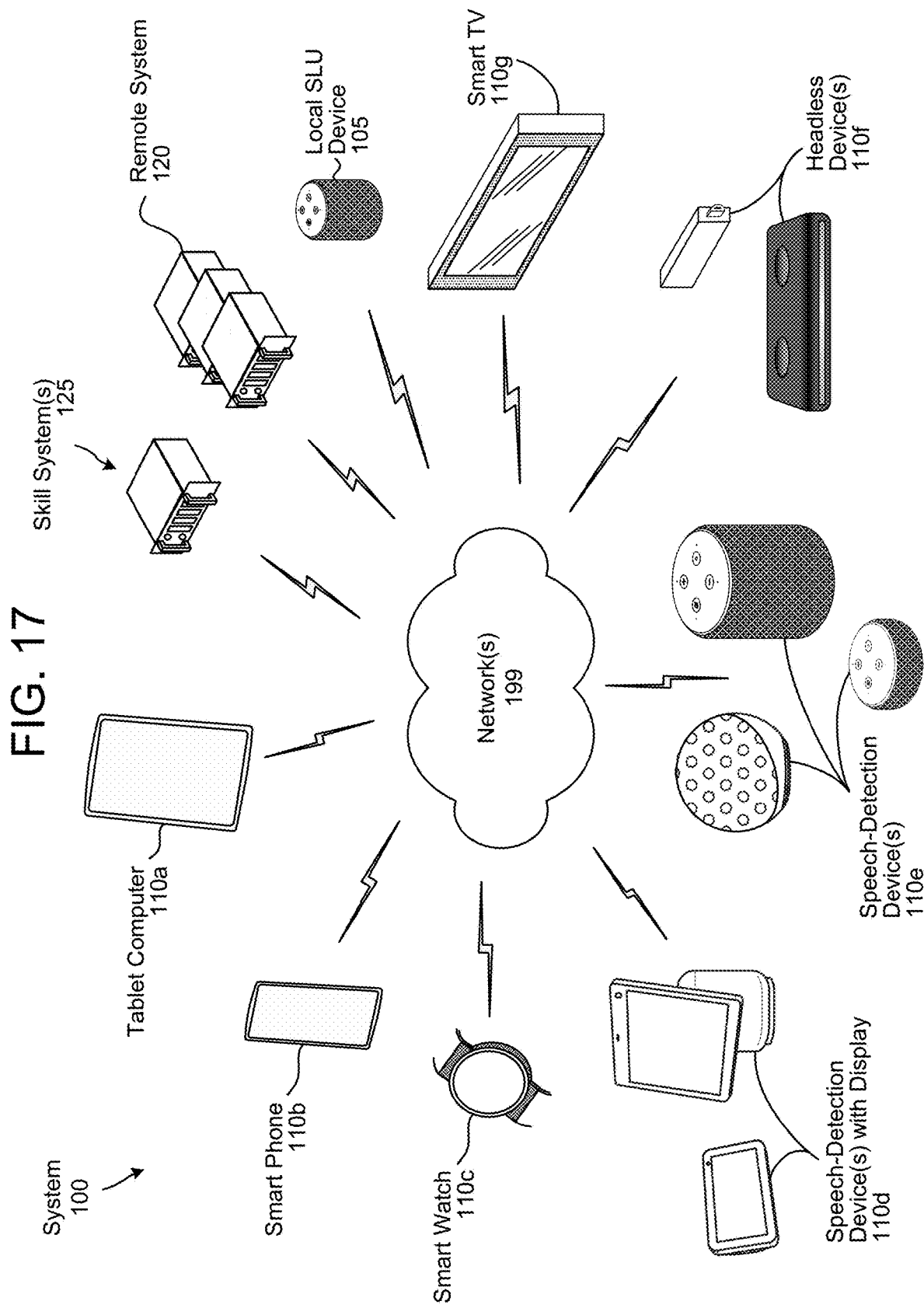

MICROPHONE OCCLUSION DETECTION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system for performing microphone occlusion detection according to embodiments of the present disclosure.

FIG. 17 illustrates an example of a computer network for use with the overall system, according to embodiments of the present disclosure.

DETAILED DESCRIPTION

Figure 2A:
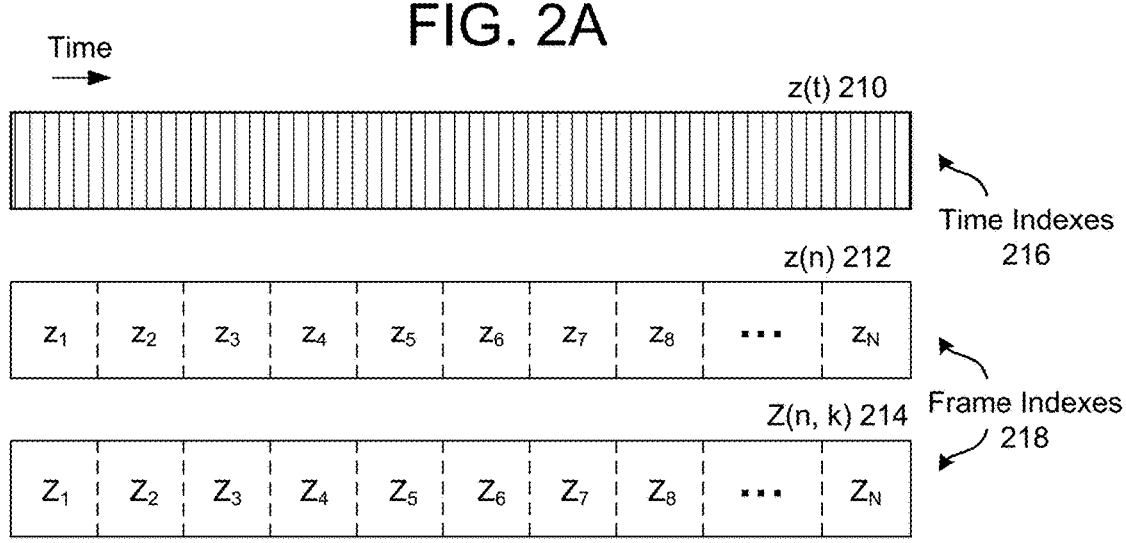
FIGS. 2A-2D illustrate examples of frame indexes, tone indexes, and channel indexes.

Electronic devices may be used to capture and/or process audio data. In some examples, electronic devices may be used to determine actions responsive to input commands represented in the audio data. To improve speech processing and correctly identify actions responsive to the input commands, an electronic device may perform audio processing on the audio data, such as echo cancellation, spatial processing (e.g., beamforming), and/or the like, in order to remove noise and isolate the speech representing the input commands.

When a user is holding the electronic device, however, the user may accidentally cause intermittent microphone occlusion events to occur. For example, the user may partially and/or completely cover a microphone of the electronic device while holding the electronic device. These microphone occlusion events affect characteristics of the audio data captured by the microphones, such as a frequency response, transfer function, and/or the like. As a result of the microphone occlusion, performing spatial processing may decrease an audio quality of the audio data by causing distortion, attenuation of the speech, and/or the like.

To improve an audio quality and an accuracy of speech processing, devices, systems and methods are disclosed that perform microphone occlusion detection. When a microphone occlusion event is detected, a device will modify how audio data is processed prior to speech processing, such as by disabling spatial processing (e.g., disabling adaptive beamforming processing) and only using audio data from a single microphone. The device detects the microphone occlusion event by determining inter-level difference (ILD) value(s) between two microphone signals and using the ILD value(s) as input feature(s) to a classifier. For example, when a far-end reference signal is inactive (e.g., device is not outputting audio), the classifier may process a first ILD value within a high frequency band. However, when the far-end reference signal is active (e.g., device is outputting audio), the classifier may process the first ILD value and a second ILD value within a low frequency band.

FIG. 1 illustrates a high-level conceptual block diagram of a system 100 configured to perform microphone occlusion detection according to embodiments of the disclosure. Although FIG. 1 and other figures/discussion illustrate the operation of the system in a particular order, the steps described may be performed in a different order (as well as certain steps removed or added) without departing from the intent of the disclosure. As illustrated in FIG. 1, the system 100 may include a device 110 associated with a user 5, a local spoken language understanding (SLU) device 105, and/or a remote system 120, which may all be communicatively coupled to network(s) 199.

As described in greater detail below with regard to FIG. 14, in some examples the remote system 120 may be configured to perform natural language processing (NLP) to determine actions responsive to input commands (e.g., speech s(t)) received from the user 5 without departing from the disclosure. For example, the remote system 120 may process audio data received from the device 110 to determine an action to perform that is responsive to a voice command represented in the audio data. However, the disclosure is not limited thereto and the remote system 120 may receive input commands using any techniques known to one of skill in the art without departing from the disclosure. Additionally or alternatively, the device 110 and/or the SLU device 105 may be configured to perform natural language processing to determine actions responsive to input commands received from the user 5 without departing from the disclosure.

In some examples, the device 110 may generate microphone audio signals z(n) using two or more microphones 112. For example, the device 110 may include two microphones, such that a first microphone 112a may generate a first microphone audio signal $z_1(n)$ and a second microphone 112b may generate a second microphone audio signal $z_2(n)$. During normal operation, the device 110 may perform spatial processing (e.g., beamforming) using both of the microphone audio signals z(n) in order to generate directional audio data. For example, the device 110 may perform adaptive beamforming processing (e.g., adaptive beamforming) to generate output audio data that represents speech s(t) corresponding to a particular direction or directions associated with the user 5.

When the user 5 is holding the device 110, however, the user 5 may cause intermittent microphone occlusion events to occur. For example, the user 5 may partially and/or completely cover one of the microphones 112 while holding the device 110. As the microphone occlusion only occurs to one of the microphones 112, performing spatial processing results in output audio data with a lower audio quality. To avoid this, the device 110 may be configured to detect a microphone occlusion event and disable spatial processing (e.g., adaptive beamforming processing) when the microphone occlusion event is detected. For example, the device 110 may detect the microphone occlusion event by determining that the first microphone 112a is occluded and may generate output audio data using only the second microphone audio signal $z_2(n)$ without performing beamforming, although the disclosure is not limited thereto.

As illustrated in FIG. 1, the first device 110a may receive (130) first audio data from microphones. For example, the first audio data may include a first microphone signal from a first microphone 112a and a second microphone signal from a second microphone 112b. Using the first audio data, the device 110 may perform (132) occlusion event detection to generate event data. To detect a potential occlusion event, the device 110 may determine interlevel difference (ILD) measurement values between the first microphone signal and the second microphone signal and use the ILD measurement values as input features to a classifier, as described in greater detail below with regard to FIG. 8. For example, when a far-end reference signal is inactive (e.g., device is not outputting audio), the classifier may process a first ILD value (e.g., first difference value) within a high frequency band. However, when the far-end reference signal is active (e.g., device is outputting audio), the classifier may process the first ILD value and a second ILD value (e.g., second difference value) within a low frequency band.

When the far-end reference signal is active, the device 110 may optionally perform (134) echo cancellation to remove an echo signal from the first audio data. For example, the device 110 may generate output audio using the far-end reference signal. While generating the output audio, the microphones 112 may generate the first audio data, which includes a representation of desired speech s(t) along with a representation of the echo signal (e.g., portion of the output audio recaptured by the microphones 112). To perform echo cancellation, the device 110 may generate an estimated echo signal using the far-end reference signal and subtract the estimated echo signal from the first audio data, thus isolating the desired speech s(t).

When a microphone occlusion event is detected, the device 110 may modify how the first audio data is processed prior to speech processing, such as by disabling spatial processing (e.g., disabling adaptive beamforming processing) and only using audio data from a single microphone. For example, the device 110 may determine (136) whether an occlusion event is detected using the event data. If an occlusion event is not detected, the device 110 may perform (138) adaptive beamforming processing to generate directional audio signals and may optionally perform (140) signal processing to generate output audio data, as described in greater detail below with regard to FIGS. 5-6.

If an occlusion event is detected, however, the device 110 may select (142) one of the microphone audio signals to output and may optionally perform (144) signal processing to generate the output audio data. For example, the device 110 may determine that the first microphone 112a is occluded during the occlusion event and may select the second microphone signal, although the disclosure is not limited thereto. The signal processing performed on the microphone signal in step 144 may be different than the signal processing performed on the directional audio signal(s) in step 140, although the disclosure is not limited thereto.

Whether the device 110 generates the output audio data by performing adaptive beamforming processing or by selecting the microphone audio signal, the device 110 may cause (146) speech processing to be performed on the output audio data. For example, the device 110 may perform local speech processing on the device 110, may send the output audio data to the local SLU device 105 via a wireless router, may send the output audio data to the remote system 120 via the network(s) 199, and/or the like without departing from the disclosure.

An audio signal is a representation of sound and an electronic representation of an audio signal may be referred to as audio data, which may be analog and/or digital without departing from the disclosure. For ease of illustration, the disclosure may refer to either audio data (e.g., microphone audio data, input audio data, etc.) or audio signals (e.g., microphone audio signal, input audio signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

In some examples, the audio data may correspond to audio signals in a time-domain. However, the disclosure is not limited thereto and the device 110 may convert these signals to a subband-domain or a frequency-domain prior to performing additional processing, such as adaptive feedback reduction (AFR) processing, acoustic echo cancellation (AEC), noise reduction (NR) processing, tap detection, and/or the like. For example, the device 110 may convert the time-domain signal to the subband-domain by applying a bandpass filter or other filtering to select a portion of the time-domain signal within a desired frequency range. Additionally or alternatively, the device 110 may convert the time-domain signal to the frequency-domain using a Fast Fourier Transform (FFT) and/or the like.

As used herein, audio signals or audio data (e.g., microphone audio data, or the like) may correspond to a specific range of frequency bands. For example, the audio data may correspond to a human hearing range (e.g., 20 Hz-20 kHz), although the disclosure is not limited thereto.

As used herein, a frequency band (e.g., frequency bin) corresponds to a frequency range having a starting frequency and an ending frequency. Thus, the total frequency range may be divided into a fixed number (e.g., 256, 512, etc.) of frequency ranges, with each frequency range referred to as a frequency band and corresponding to a uniform size. However, the disclosure is not limited thereto and the size of the frequency band may vary without departing from the disclosure.

FIGS. 2A-2D illustrate examples of frame indexes, tone indexes, and channel indexes. As described above, the device 110 may generate microphone audio data z(t) using microphone(s) 112. For example, a first microphone may generate first microphone audio data $z_1(t)$ in the time-domain, a second microphone may generate second microphone audio data $z_2(t)$ in the time-domain, and so on. As illustrated in FIG. 2A, a time-domain signal may be represented as microphone audio data z(t) 210, which is comprised of a sequence of individual samples of audio data. Thus, z(t) denotes an individual sample that is associated with a time t.

While the microphone audio data z(t) 210 is comprised of a plurality of samples, in some examples the device 110 may group a plurality of samples and process them together. As illustrated in FIG. 2A, the device 110 may group a number of samples together in a frame to generate microphone audio data z(n) 212. As used herein, a variable z(n) corresponds to the time-domain signal and identifies an individual frame (e.g., fixed number of samples s) associated with a frame index n.

In some examples, the device 110 may convert microphone audio data z(t) 210 from the time-domain to the subband-domain. For example, the device 110 may use a plurality of bandpass filters to generate microphone audio data z(t, k) in the subband-domain, with an individual bandpass filter centered on a narrow frequency range. Thus, a first bandpass filter may output a first portion of the microphone audio data z(t) 210 as a first time-domain signal associated with a first subband (e.g., first frequency range), a second bandpass filter may output a second portion of the microphone audio data z(t) 210 as a time-domain signal associated with a second subband (e.g., second frequency range), and so on, such that the microphone audio data z(t, k) comprises a plurality of individual subband signals (e.g., subbands). As used herein, a variable z(t, k) corresponds to the subband-domain signal and identifies an individual sample associated with a particular time t and tone index k.

For ease of illustration, the previous description illustrates an example of converting microphone audio data z(t) 210 in the time-domain to microphone audio data z(t, k) in the subband-domain. However, the disclosure is not limited thereto, and the device 110 may convert microphone audio data z(n) 212 in the time-domain to microphone audio data z(n, k) the subband-domain without departing from the disclosure.

Additionally or alternatively, the device 110 may convert microphone audio data z(n) 212 from the time-domain to a frequency-domain. For example, the device 110 may perform Discrete Fourier Transforms (DFTs) (e.g., Fast Fourier transforms (FFTs), short-time Fourier Transforms (STFTs), and/or the like) to generate microphone audio data Z(n, k) 214 in the frequency-domain. As used herein, a variable Z(n, k) corresponds to the frequency-domain signal and identifies an individual frame associated with frame index n and tone index k. As illustrated in FIG. 2A, the microphone audio data z(t) 212 corresponds to time indexes 216, whereas the microphone audio data z(n) 212 and the microphone audio data Z(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data Z(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency-domain representation of that same waveform comprises a plurality of discrete amplitude values, where each amplitude value is for a different tone or "bin." So, for example, if the sound wave consisted solely of a pure sinusoidal 1 kHz tone, then the frequency-domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data z(t) 210) and frame indexes 218 (e.g., microphone audio data z(n) 212 in the time-domain and microphone audio data Z(n, k) 216 in the frequency-domain). For example, the system 100 may apply FFT processing to the time-domain microphone audio data z(n) 212, producing the frequency-domain microphone audio data Z(n, k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
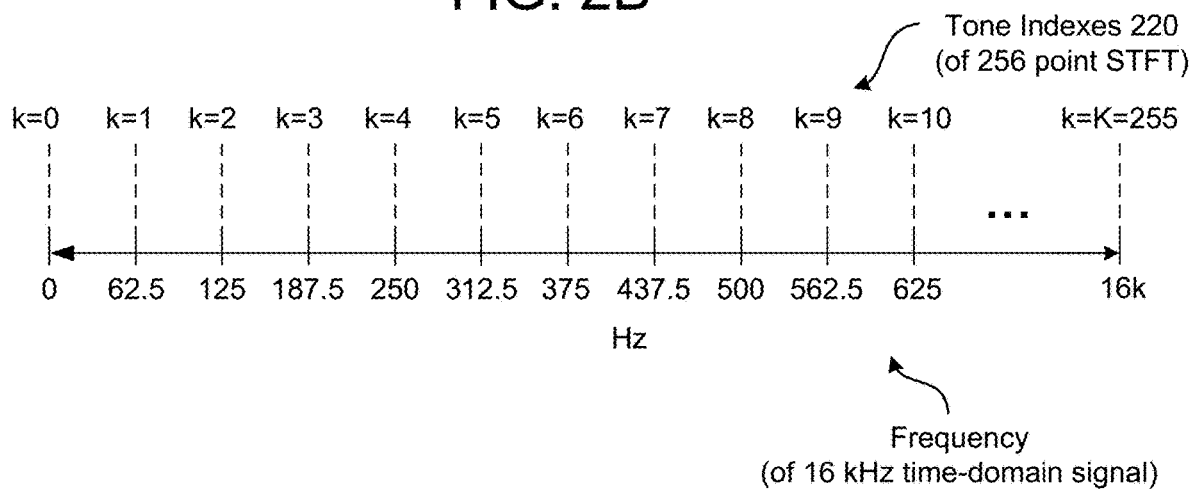

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 2B illustrates the frequency range being divided into 256 different frequency ranges (e.g., tone indexes), the disclosure is not limited thereto and the system 100 may divide the frequency range into K different frequency ranges (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
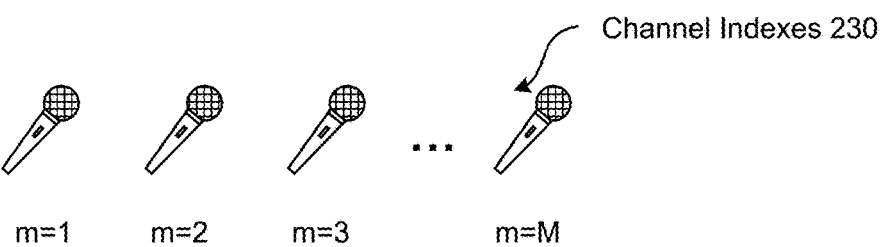

The system 100 may include multiple microphones 112, with a first channel m corresponding to a first microphone (e.g., m=1), a second channel (m+1) corresponding to a second microphone (e.g., m=2), and so on until a final channel (M) that corresponds to final microphone (e.g., m=M). FIG. 2C illustrates channel indexes 230 including a plurality of channels from channel m=1 to channel m=M. While an individual device 110 may include multiple microphones 112, during a communication session the device 110 may select a single microphone and generate microphone audio data using the single microphone. However, while many drawings illustrate a single channel (e.g., one microphone), the disclosure is not limited thereto and the number of channels may vary. For the purposes of discussion, an example of system 100 may include "M" microphones (M≥1) for hands free near-end/far-end distant speech recognition applications.

While FIGS. 2A-2D are described with reference to the microphone audio data z(t), the disclosure is not limited thereto and the same techniques apply to the playback audio data x(t) (e.g., reference audio data) without departing from the disclosure. Thus, playback audio data x(t) indicates a specific time index t from a series of samples in the time-domain, playback audio data x(n) indicates a specific frame index n from series of frames in the time-domain, and playback audio data X(n, k) indicates a specific frame index n and frequency index k from a series of frames in the frequency-domain.

Prior to converting the microphone audio data z(n) and the playback audio data x(n) to the frequency-domain, the device 110 may first perform time-alignment to align the playback audio data x(n) with the microphone audio data z(n). For example, due to nonlinearities and variable delays associated with sending the playback audio data x(n) to loudspeaker(s) using a wired and/or wireless connection, the playback audio data x(n) may not be synchronized with the microphone audio data z(n). This lack of synchronization may be due to a propagation delay (e.g., fixed time delay) between the playback audio data x(n) and the microphone audio data z(n), clock jitter and/or clock skew (e.g., difference in sampling frequencies between the device 110 and the loudspeaker(s)), dropped packets (e.g., missing samples), and/or other variable delays.

To perform the time alignment, the device 110 may adjust the playback audio data x(n) to match the microphone audio data z(n). For example, the device 110 may adjust an offset between the playback audio data x(n) and the microphone audio data z(n) (e.g., adjust for propagation delay), may add/subtract samples and/or frames from the playback audio data x(n) (e.g., adjust for drift), and/or the like. In some examples, the device 110 may modify both the microphone audio data z(n) and the playback audio data x(n) in order to synchronize the microphone audio data z(n) and the playback audio data x(n). However, performing nonlinear modifications to the microphone audio data z(n) results in first microphone audio data $z_1(n)$ associated with a first microphone to no longer be synchronized with second microphone audio data $z_2(n)$ associated with a second microphone. Thus, the device 110 may instead modify only the playback audio data x(n) so that the playback audio data x(n) is synchronized with the first microphone audio data $z_1(n)$.

While FIG. 2A illustrates the frame indexes 218 as a series of distinct audio frames, the disclosure is not limited thereto. In some examples, the device 110 may process overlapping audio frames and/or perform calculations using overlapping time windows without departing from the disclosure. For example, a first audio frame may overlap a second audio frame by a certain amount (e.g., 80%), such that variations between subsequent audio frames are reduced. Additionally or alternatively, the first audio frame and the second audio frame may be distinct without overlapping, but the device 110 may determine power value calculations using overlapping audio frames. For example, a first power value calculation associated with the first audio frame may be calculated using a first portion of audio data (e.g., first audio frame and n previous audio frames) corresponding to a fixed time window, while a second power calculation associated with the second audio frame may be calculated using a second portion of the audio data (e.g., second audio frame, first audio frame, and n−1 previous audio frames) corresponding to the fixed time window. Thus, subsequent power calculations include n overlapping audio frames.

Figure 2D:
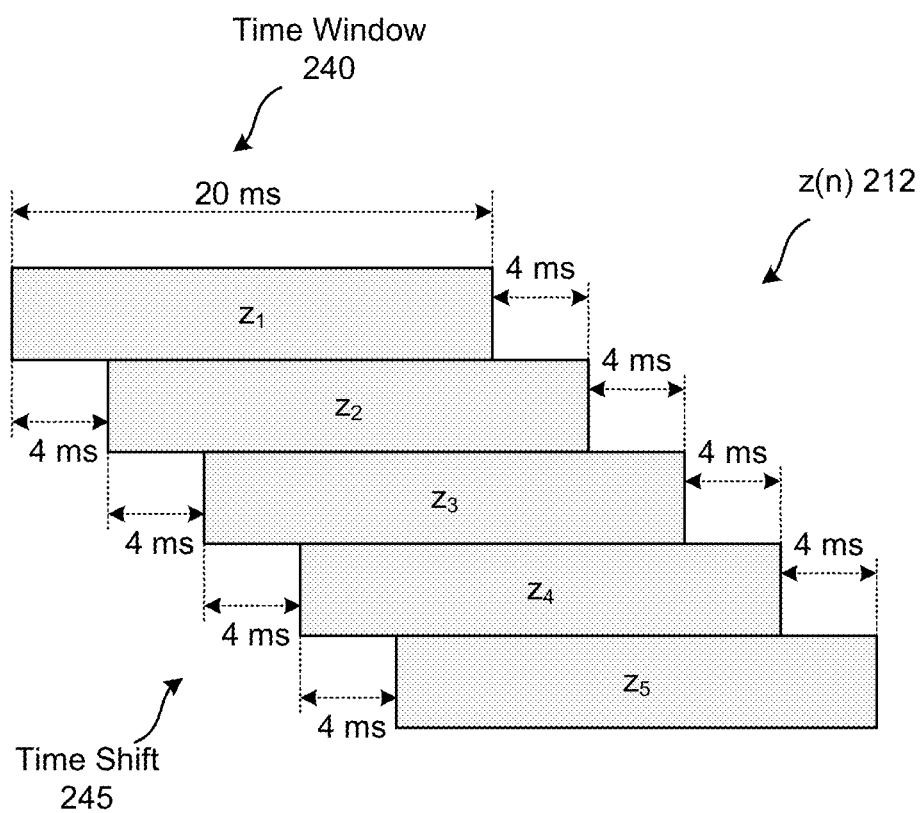

As illustrated in FIG. 2D, overlapping audio frames may be represented as overlapping audio data associated with a time window 240 (e.g., 20 ms) and a time shift 245 (e.g., 4 ms) between neighboring audio frames. For example, a first audio frame x1 may extend from 0 ms to 20 ms, a second audio frame x2 may extend from 4 ms to 24 ms, a third audio frame x3 may extend from 8 ms to 28 ms, and so on. Thus, the audio frames overlap by 80%, although the disclosure is not limited thereto and the time window 240 and the time shift 245 may vary without departing from the disclosure.

Figure 3:
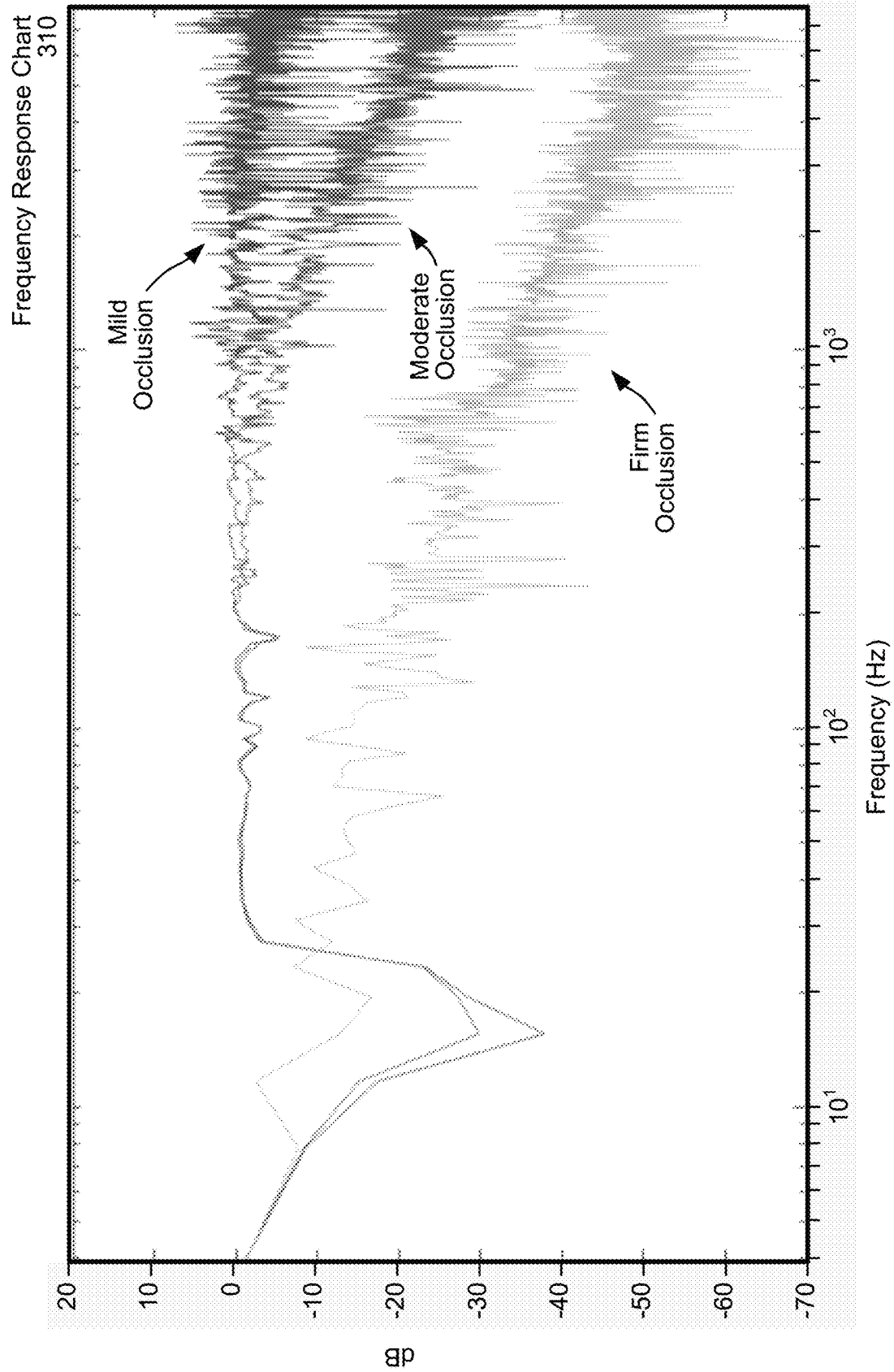
FIG. 3 illustrates an example of frequency responses associated with different types of occlusion events according to embodiments of the present disclosure.
Figure 4:
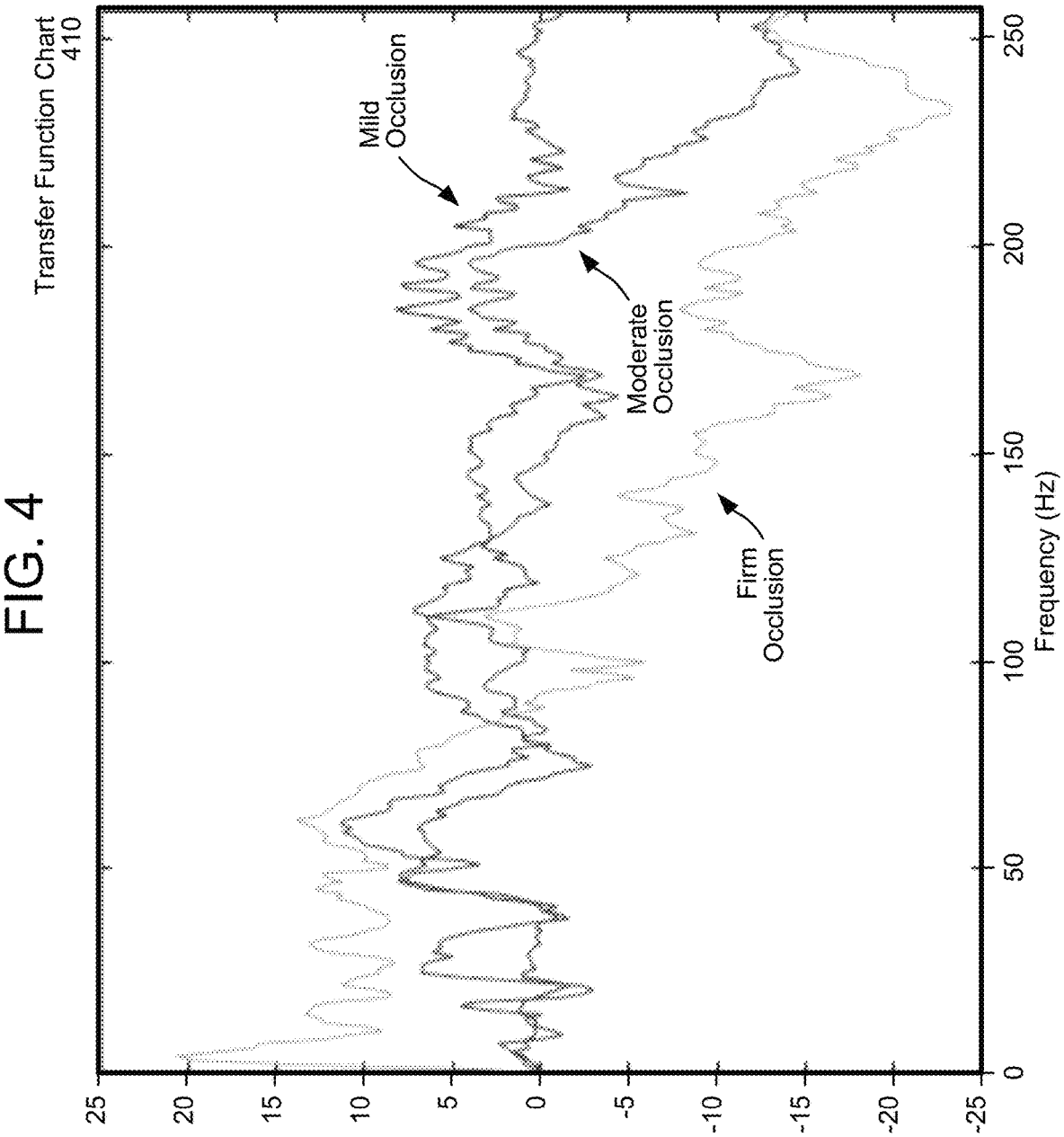
FIG. 4 illustrates an example of transfer functions associated with different types of occlusion events according to embodiments of the present disclosure.

As described above with regard to FIG. 1, when a user 5 is holding the device 110, the user 5 may cause intermittent microphone occlusion events to occur. For example, the user 5 may partially and/or completely cover one of the microphones 112 while holding the device 110. As illustrated in FIGS. 3-4, a microphone occlusion event introduces path changes to the microphones 112, such as changing a frequency response associated with an external audio source or a transfer function associated with an internal audio source.

FIG. 3 illustrates an example of frequency responses associated with different types of occlusion events according to embodiments of the present disclosure. As illustrated in FIG. 3, a microphone occlusion event changes a frequency response of a signal representing an external source captured by the microphones 112 (e.g., playback audio generated by an external loudspeaker and/or speech generated by a user 5). For example, frequency response chart 310 illustrates a first frequency response associated with mild occlusion (e.g., top signal, with only minor attenuation in higher frequency ranges), a second frequency response associated with moderate occlusion (e.g., middle signal, with moderate attenuation in the higher frequency ranges), and a third frequency response associated with firm occlusion (e.g., bottom signal, with moderate attenuation throughout multiple frequency ranges and major attenuation at the higher frequency ranges). Thus, an intensity of the microphone occlusion event varies the frequency response over time, and a firm microphone occlusion event acts like a low-pass filter that attenuates medium frequency ranges and high frequency ranges of a signal corresponding to an external source.

FIG. 4 illustrates an example of transfer functions associated with different types of occlusion events according to embodiments of the present disclosure. As illustrated in FIG. 4, a microphone occlusion event also changes a transfer function associated with an internal playback source captured by the microphones 112 (e.g., playback audio generated by an internal loudspeaker 114). For example, an echo signal corresponding to playback audio captured by the microphones 112 may be amplified by the microphone occlusion event. This is due to the fact that internal leakage echo components are unable to escape from the microphone holes as these holes are blocked by the microphone occlusion event. In some examples, this may create constructive standing waves by reflecting inside the device 110, resulting in low frequency amplification of the echo signal.

As illustrated in FIG. 4, transfer function chart 410 illustrates a first transfer function associated with mild occlusion (e.g., top signal on the right hand side of the transfer function chart 410, with gain values centered around zero), a second transfer function associated with moderate occlusion (e.g., middle signal on the right hand side of the transfer function chart 410, with amplification at lower frequency ranges and attenuation at higher frequency ranges), and a third transfer function associated with firm occlusion (e.g., bottom signal on the right hand side of the transfer function chart 410, with significant amplification at the lower frequency ranges followed by significant attenuation at the higher frequency ranges). Thus, an intensity of the microphone occlusion event varies the transfer function over time, and a firm microphone occlusion event may even amplify the echo signal at the lower frequencies.

Figure 5:
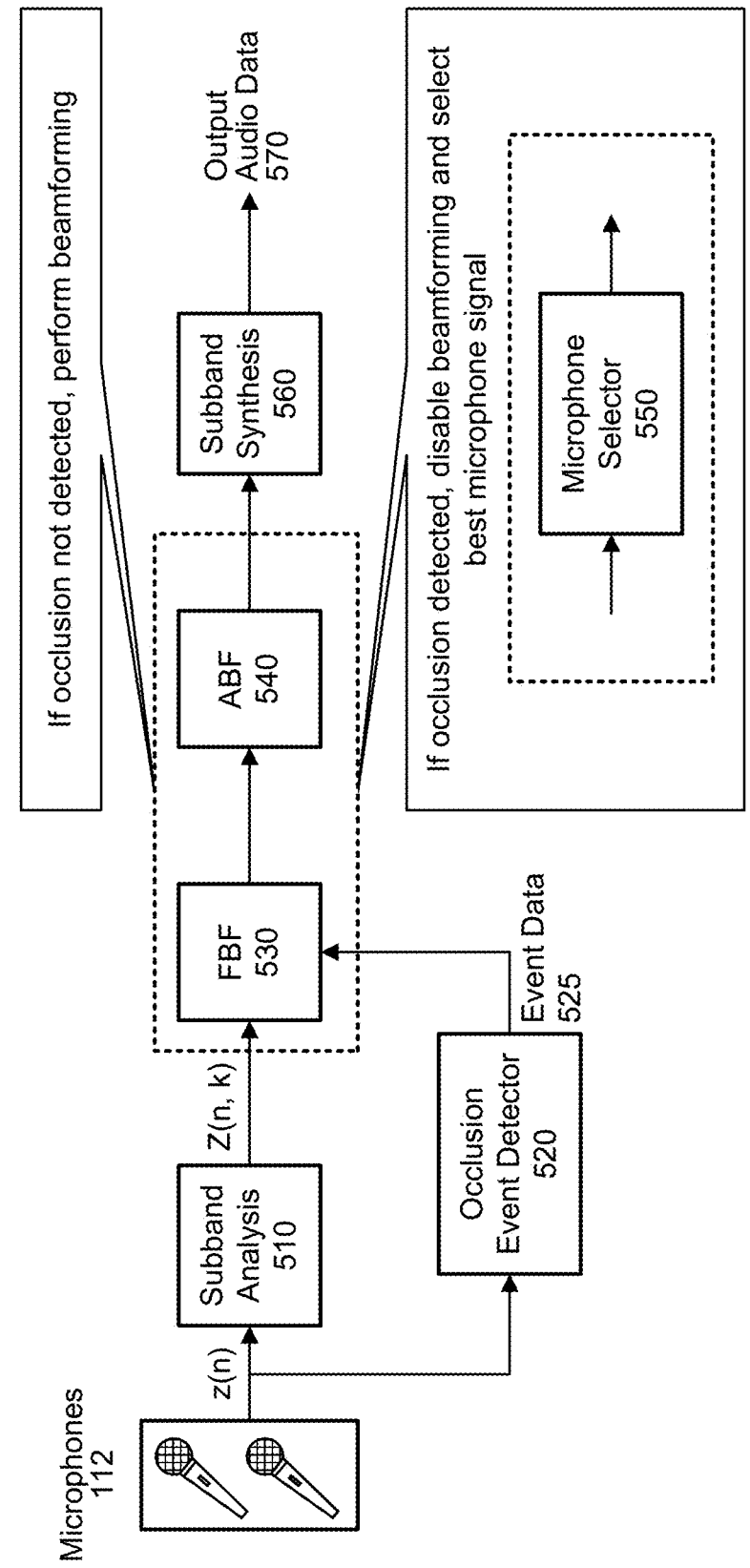
FIG. 5 illustrates an example component diagram for performing microphone occlusion detection without a reference signal according to embodiments of the present disclosure.

FIG. 5 illustrates an example component diagram for performing microphone occlusion detection without a reference signal according to embodiments of the present disclosure. As illustrated in FIG. 5, the device 110 may generate microphone audio signals z(n) using two or more microphones 112. For example, in some examples the device 110 may include two microphones, such that a first microphone 112a may generate a first microphone audio signal $z_1(n)$ and a second microphone 112b may generate a second microphone audio signal $z_2(n)$. During normal operation, the device 110 may perform spatial processing (e.g., beamforming) using both of the microphone audio signals z(n) in order to generate directional audio data. For example, the device 110 may perform adaptive beamforming processing to generate output audio data that represents speech s(t) corresponding to a particular direction or directions associated with the user 5.

When the user 5 is holding the device 110, however, the user 5 may cause intermittent microphone occlusion events to occur (e.g., the user 5 may partially and/or completely cover one of the microphones 112). As described above, the microphone occlusion event may affect both a frequency response associated with an external audio source and/or a transfer function associated with an internal audio source. For example, the microphone occlusion event may introduce path changes to the microphones 112, which may result in changes to a microphone directivity pickup pattern, a microphone frequency response, a transfer function, an echo path, and/or the like. These changes may lead to a performance loss during spatial processing and/or divergences during echo cancellation, resulting in output audio data with a lower audio quality.

To improve the audio quality of the output audio data, the device 110 may be configured to detect a microphone occlusion event and disable spatial processing when the microphone occlusion event is detected. For example, the device 110 may detect the microphone occlusion event by determining that the first microphone 112a is occluded and may generate output audio data using only the second microphone audio signal $z_2(n)$ without performing beamforming.

While the above example refers to the device 110 including two microphones 112, the disclosure is not limited thereto and the device 110 may include three or more microphones 112 without departing from the disclosure. In some examples, the device 110 may include three or more microphones but may select only two microphones with which to perform spatial processing and generate the output audio data. Thus, the device 110 may perform the microphone occlusion detection described herein using the microphone audio signals z(n) generated by the two selected microphones 112. In these examples, the device 110 may detect the microphone occlusion event and select a different microphone audio signal with which to perform spatial processing and generate the output audio data. For example, the device 110 may detect the microphone occlusion event by determining that the first microphone 112a is occluded and may generate the output audio data using the second microphone audio signal $z_2(n)$ and a third microphone audio signal $z_3(n)$ associated with a third microphone 112c.

In other examples, the device 110 may perform spatial processing and generate the output audio data using three or more microphones 112 without departing from the disclosure. Thus, the device 110 may perform the microphone occlusion detection described herein for each pair of microphone audio signals. For example, if the device 110 includes three microphones 112a-112c, the device 110 may perform first microphone occlusion detection using a first pair of microphone audio signals (e.g., the first microphone audio signal $z_1(n)$ and the second microphone audio signal $z_2(n)$) and then perform second microphone occlusion detection using a second pair of microphone audio signals (e.g., the second microphone audio signal $z_2(n)$ and the third microphone audio signal $z_3(n)$). By performing microphone occlusion detection for each pair of microphone audio signals, the device 110 may detect when an individual microphone 112 is occluded. When the device 110 detects the microphone occlusion event, the device 110 may reduce a number of audio signal with which to perform spatial processing and generate the output audio data. For example, the device 110 may detect the microphone occlusion event by determining that the first microphone 112a is occluded and may generate the output audio data using the second microphone audio signal $z_2(n)$ and the third microphone audio signal $z_3(n)$ without departing from the disclosure.

FIG. 5 illustrates an example of the device 110 performing occlusion processing 500 without a reference signal. Thus, the occlusion processing 500 occurs when the device 110 is not receiving a reference signal (e.g., playback audio data) and is not generating output audio. As illustrated in FIG. 5, the device 110 may generate the microphone audio signals z(n) using two of the microphones 112. For example, the first microphone 112a may generate a first microphone audio signal $z_1(n)$ and the second microphone 112b may generate a second microphone audio signal $z_2(n)$. The microphones 112 may send the microphone audio signals z(n) to a subband analysis component 510 and to an occlusion event detector component 520.

The subband analysis component 510 may be configured to generate microphone audio signals Z(n, k) by separating the microphone audio signals z(n) into a plurality of subband signals (e.g., individual frequency ranges and/or subbands). For example, the subband analysis component 510 may include a plurality of bandpass filters, with an individual bandpass filter centered on a narrow frequency range, in order to convert the microphone audio signals z(n) from a time-domain to a subband-domain. Thus, a first bandpass filter may output a first portion of the microphone audio signals z(n) as a first time-domain signal associated with a first subband (e.g., first frequency range), a second bandpass filter may output a second portion of the microphone audio signals z(n) as a time-domain signal associated with a second subband (e.g., second frequency range), and so on, such that the microphone audio signals Z(n, k) comprise a plurality of individual subband signals.

To illustrate an example, the subband analysis component 510 may convert a first microphone audio signal $z_1(n)$ in the time-domain to a first microphone audio signal $Z_1(n, k)$ in the subband-domain and may convert a second microphone audio signal $z_2(n)$ in the time-domain to a second microphone audio signal $Z_2(n, k)$ in the subband-domain, where m is the microphone channel index, n is the frame index, k=0 to N/2 is the subband index and/or frequency index (e.g., frequency range), and N is the number of subbands.

For ease of illustration, the subband analysis component 510 is described herein as converting the microphone audio signals z(n) from the time-domain to the subband-domain. However, the disclosure is not limited thereto and in some examples the subband analysis component 510 may convert the microphone audio signals z(n) from the time-domain to a frequency-domain without departing from the disclosure. For example, the subband analysis component 510 may perform Discrete Fourier Transforms (DFTs) (e.g., Fast Fourier transforms (FFTs), short-time Fourier Transforms (STFTs), and/or the like) to convert the microphone audio signals z(n) from the time-domain to the frequency-domain and generate the microphone audio signals Z(n, k). Representing the microphone audio signals Z(n, k) in the frequency-domain is similar to representing the microphone audio signals Z(n, k) in the subband-domain, as the microphone audio signals Z(n, k) would comprise a plurality of signals corresponding to individual frequency ranges, but instead of representing an individual subband as a time-domain signal the microphone audio signals Z(n, k) would represent an individual frequency range as a frequency-domain signal. Additionally or alternatively, while the microphone audio signals z(n)/Z(n, k) correspond to individual audio frames k, the disclosure is not limited thereto and the microphone audio signals may correspond to individual audio samples associated with a time t without departing from the disclosure (e.g., microphone audio signals z(t)/Z(t, k)).

The subband analysis component 510 generates the microphone audio signals Z(n, k) in the subband-domain in order to perform audio processing. As illustrated in FIG. 5, the device 110 may perform spatial processing using multiple components, such as a Fixed Beamformer (FBF) component 530 and/or an Adaptive Beamformer (ABF) component 540, although the disclosure is not limited thereto. In order to determine what type of audio processing to perform (e.g., enable or disable spatial processing), the device 110 may perform microphone occlusion event detection using the occlusion event detector component 520.

As will be described in greater detail below with regard to FIG. 8, the occlusion event detector component 520 may receive the microphone audio signals z(n) and may generate event data 525 indicating whether a microphone occlusion event is detected. For example, the occlusion event detector component 520 may compare interlevel difference (ILD) values (e.g., difference values) between the first microphone audio signal $z_1(n)$ and the second microphone audio signal $z_2(n)$ to determine whether one of the microphones 112a-112b is occluded. The occlusion event detector component 520 may include a classifier component, a neural network (e.g., deep neural network (DNN)), and/or the like, which may be configured to analyze the ILD values and determine whether a microphone occlusion event is detected.

If the occlusion event detector component 520 does not detect a microphone occlusion event, the occlusion event detector component 520 may send the event data 525 indicating that microphone occlusion is not detected to the Fixed Beamformer (FBF) component 530. As a result, the device 110 may perform audio processing, such as spatial processing, using the microphone audio signals Z(n, k) to generate output audio data 570. For example, the device 110 may process the microphone audio signals Z(n, k) using the FBF component 530 and an Adaptive Beamformer (ABF) component 540 configured to perform adaptive beamforming processing (e.g., adaptive beamforming). In some examples, the ABF component 540 may perform adaptive beamforming processing to generate two isolated directional audio signals representing the desired speech s(t), although the disclosure is not limited thereto.

In some examples, the FBF component 530 may be configured to perform fixed beamforming to generate a plurality of directional audio signals (e.g., 8 or 12 separate audio signals, although the disclosure is not limited thereto), with a first directional audio signal corresponding to a first direction, a second directional audio signal corresponding to a second direction, and so on.

In some examples, the ABF component 540 may select two target signals (e.g., target beams) from the plurality of directional audio signals, as well as two reference signals (e.g., reference beams) for each of the target signals. For example, the ABF component 540 may select the first directional audio signal as a first target signal and the second directional audio signal as a second target signal. For the first target signal, the ABF component 540 may select a third directional audio signal and a fourth directional audio signal as first reference signals. For the second target signal, the ABF component 540 may select a fifth directional audio signal and a sixth directional audio signal as second reference signals.

Using the target signals and the reference signals, the ABF component 540 may perform adaptive interference cancellation (AIC) to generate one or more isolated directional audio signals. For example, the ABF component 540 may subtract the first reference signals (e.g., the third directional audio signal and the fourth directional audio signal) from the first target signal (e.g., the first directional audio signal) to generate a first isolated directional audio signal. Similarly, the ABF component 540 may subtract the second reference signals (e.g., the fifth directional audio signal and the sixth directional audio signal) from the second target signal (e.g., the second directional audio signal) to generate a second isolated directional audio signal. However, the disclosure is not limited thereto, and the ABF component 540 may generate the one or more isolated directional audio signals using other techniques without departing from the disclosure. For example, the number of target signals, the number of reference signals, and/or the method for selecting the target/reference signals may vary without departing from the disclosure.

As illustrated in FIG. 5, the device 110 may convert the one or more isolated directional audio signals from the subband-domain to the time-domain using a subband synthesis component 560. For example, the subband synthesis component 560 may perform the opposite operations as described above with the subband analysis component 510 to convert the one or more isolated directional audio signals back to the time-domain. In some examples, the system 100 may combine two or more isolated directional audio signals into a single signal in order to generate output audio data 570. Thus, instead of selecting a single isolated directional audio signal (e.g., a first directional audio signal corresponding to a first direction), the output audio data 570 may be generated by merging two isolated directional audio signals (e.g., the first directional audio signal corresponding to the first direction and a second directional audio signal corresponding to a second direction) in order to smooth transitions when the user 5 moves relative to the device 110. However, the disclosure is not limited thereto, and the device 110 may generate the output audio data 570 using other techniques without departing from the disclosure.

In some examples, the system 100 may average the two isolated directional audio signals to generate the output audio data 570. However, the disclosure is not limited thereto, and in other examples the system 100 may generate the output audio data 570 using a weighted average (e.g., weighted sum) based on a signal quality metric (e.g., signal to noise ratio (SNR) value, although the disclosure is not limited thereto) and/or the like without departing from the disclosure.

If the occlusion event detector component 520 detects a microphone occlusion event, however, the occlusion event detector component 520 may send the event data 525 to the FBF component 530 to indicate that a microphone occlusion event is detected (e.g., one of the microphones 112a-112b is occluded). As a result of the microphone occlusion event, spatial processing is no longer usable as the microphone occlusion attenuates one of the microphone audio signals $Z(n, k)$ and the path changes. For example, the path may change over time (e.g., intensity of occlusion varies with time), depending on the device 110 (e.g., intensity varies due to hardware characteristics), depending on the user 5 (e.g., intensity varies due user behavior), and/or the like without departing from the disclosure.

As spatial processing no longer applies, the device 110 may bypass the spatial processing pipeline and select one of the microphone audio signals $Z(n, k)$ (e.g., the non-occluded microphone audio signal $Z(n, k)$) with which to generate the output audio data 570. For example, if the device 110 determines that the second microphone audio signal $Z_2(n, k)$ is occluded, the device 110 may generate the output audio data 570 using the first microphone audio signal $Z_1(n, k)$, although the disclosure is not limited thereto.

As illustrated in FIG. 5, when the microphone occlusion event is detected, the audio processing pipeline (e.g., the FBF component 530 and the ABF component 540) may be represented as a single component, illustrated as a microphone selector component 550. For example, the microphone selector component 550 may be configured to select between the first microphone audio signal $Z_1(n, k)$ and the second microphone audio signal $Z_2(n, k)$. However, this is intended to conceptually illustrate an example and the disclosure is not limited thereto. Instead, the device 110 may select between the microphone audio signals $Z(n, k)$ using the FBF component 530 and/or other components of the device 110 without departing from the disclosure.

While FIG. 5 illustrates an example in which the device 110 generates the output audio data 570 using a single microphone audio signal $Z(n, k)$ when a microphone occlusion event is detected, the disclosure is not limited thereto. Instead, the device 110 may determine that the second microphone 112b is occluded and may generate the output audio data 570 by performing spatial processing using the first microphone audio signal $Z_1(n, k)$ and a third microphone audio signal $Z_3(n, k)$ associated with a third microphone 112c without departing from the disclosure. Additionally or alternatively, the device 110 may be configured to generate the output audio data 570 by performing spatial processing using three or more microphone audio signals (e.g., first microphone audio signal $Z_1(n, k)$, second microphone audio signal $Z_2(n, k)$, and third microphone audio signal $Z_3(n, k)$). Thus, when the device 110 detects the microphone occlusion event, the device 110 may remove the occluded microphone and continue performing spatial processing using two or more microphone audio signals (e.g., first microphone audio signal $Z_1(n, k)$ and third microphone audio signal $Z_3(n, k)$), although the disclosure is not limited thereto.

While FIG. 5 illustrates an example in which the device 110 performs microphone occlusion event detection without a reference audio signal (e.g., device 110 is not generating playback audio), the same steps may be performed when a reference audio signal is present (e.g., device 110 is generating playback audio). For example, prior to performing spatial processing, the device 110 may be configured to perform echo cancellation to remove an echo signal represented in the microphone audio signals $Z(n, k)$ without departing from the disclosure.

In addition to removing the echo signal and improving an audio quality of the output audio data 570, performing echo cancellation may influence how the occlusion event detector component 520 generates the event data 525. For example, when echo cancellation is converged (e.g., working correctly), the occlusion event detector component 520 may detect the microphone occlusion event based on the inter-level difference (ILD) values mentioned above with regard to FIG. 5. However, the device 110 may determine that the echo cancellation is diverging (e.g., not working correctly to estimate and remove the echo signal from the microphone audio signal $Z(n, k)$) and may use this as an input feature to indicate that a microphone occlusion event is present.

Figure 6:
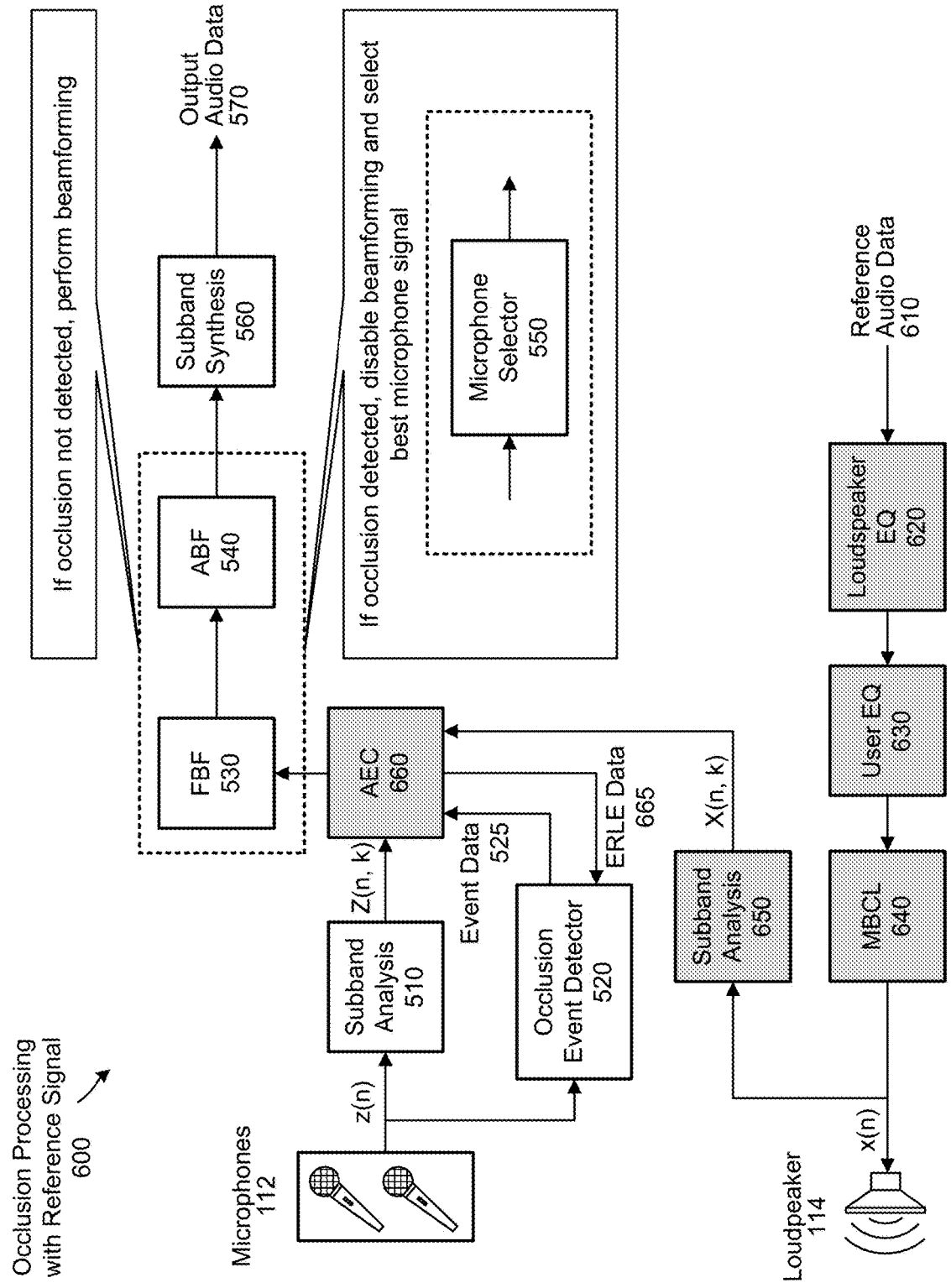
FIG. 6 illustrates an example component diagram for performing microphone occlusion detection with a reference signal according to embodiments of the present disclosure.

FIG. 6 illustrates an example component diagram for performing microphone occlusion detection with a reference signal according to embodiments of the present disclosure. As many of the components illustrated in FIG. 6 are described above with regard to FIG. 5, a redundant description is omitted.

As illustrated in FIG. 6, the device 110 may perform occlusion processing 600 with a reference signal when the device 110 generates output audio (e.g., playback audio) using reference audio data 610. For example, the device 110 may receive the reference audio data 610 and may process the reference audio data 610 using a loudspeaker equalizer (EQ) component 620, a user equalizer (EQ) component 630, and a multi-band compressor-limiter (MBCL) component 640 to generate playback audio data $x(n)$ to send to the loudspeaker 114.

The loudspeaker EQ component 620 and the user EQ component 630 may perform equalization (e.g., apply different gain values to different frequency bands of the reference audio data 610) to generate second reference audio data and third reference audio data, respectively. The audio processing performed by the loudspeaker EQ component 620 and/or the user EQ component 630 depends on settings and/or user preferences stored by the device 110 and/or applications running on the device 110. For example, equalization settings may be static for the device 110, may be genre-specific (e.g., equalization settings change based on a genre of music), may be user-specific (e.g., equalization settings change based on user profile), may be application or process specific (e.g., each process running on the device 110 has different equalization settings), and/or may be controlled by a user interface (e.g., enabling the user 5 to easily change the equalization settings). Thus, in some examples the equalization settings may vary depending on a time of day, a source of audio, an application, a genre of music, and/or the like. To illustrate an example of the equalization settings varying based on genre, loudspeaker EQ component 620 and/or the user EQ component 630 may apply first equalization settings for a first genre of music (e.g., jazz) and second equalization settings for a second genre of music (e.g., rock).

The user EQ component 630 may output the third reference audio data to the MBCL component 640, which may perform multi-band compression/limiting (e.g., compensate for distortion that is unique to one or more loudspeaker(s) 114 associated with the device 110) to generate the playback audio data x(n). For example, the MBCL component 640 may perform audio processing specific for the one or more loudspeaker(s) 114 that are associated with the device 110 and used to generate the output audio. Thus, the audio processing performed by the MBCL component 640 is static for the device 110. Finally, the playback audio data x(n) is sent to the one or more loudspeaker(s) 114, which may generate output audio based on the playback audio data x(n).

The microphones 112 may capture a portion of the output audio as an echo signal represented in the microphone audio signals Z(n, k). To remove the echo signal from the microphone audio signals Z(n, k), the device 110 may include an acoustic echo canceller (AEC) component 660 configured to perform echo cancellation. For example, a subband analysis component 650 may convert the playback audio data x(n) from the time-domain to the subband-domain to generate playback audio data X(n, k), and the AEC component 660 may subtract at least a portion of the playback audio data X(n, k) from the microphone audio signals Z(n, k) to generate isolated microphone audio signals Z'(n, k).

As described above with regard to FIG. 5, the microphone audio signals z(n) generated by the microphones 112a/112b are mapped to the subband-domain by the subband analysis component 510. Similarly, the subband analysis component 650 may convert the playback audio signal x(n) in the time-domain to a playback audio signal X(n, k) in the subband-domain, where n is the frame index, k=0 to N/2 is the frequency index, and N is the number of subbands.

While FIG. 6 illustrates an example including a single loudspeaker 114, the disclosure is not limited thereto and the device 110 may include two or more loudspeakers 114 without departing from the disclosure. In some examples, the AEC component 660 may be a multi-channel AEC component configured to perform echo cancellation using two or more reference channels. Thus, the playback audio data X(n, k) may correspond to two or more loudspeakers 114, such that the playback audio signal associated with the xth loudspeaker 114x may be represented as $X_x(n, k)$, where x denotes the loudspeaker channel index, n denotes the frame index, and k denotes the sub-band index. Thus, while FIG. 6 illustrates an example using a single reference channel, the disclosure is not limited thereto and the number of reference signals may vary without departing from the disclosure.

The AEC component 660 may receive the microphone audio signals Z(n, k) output by the subband analysis component 510 and the playback audio data X(n, k) output by the subband analysis component 650, and may be configured to perform echo cancellation to generate the isolated microphone audio signals Z'(n, k). For example, the AEC component 660 may determine an estimated echo signal using the playback audio data X(n, k) and may perform echo cancellation by subtracting the estimated echo signal from the microphone audio signals Z(n, k) to generate the isolated microphone audio signals Z'(n, k).

In the example illustrated in FIG. 6, the AEC component 660 may receive the playback audio data X(n, k) and may use adaptive filters to generate the estimated echo signal. However, the disclosure is not limited thereto and in other examples the AEC component 660 may perform echo cancellation using other techniques without departing from the disclosure. For example, the AEC component 660 may receive a third microphone audio signal $Z_3(n, k)$ generated by a third microphone 112c and may generate the estimated echo signal using the third microphone audio signal $Z_3(n, k)$ without departing from the disclosure. Thus, the AEC component 660 may perform acoustic echo cancellation (AEC), adaptive interference cancellation (AIC) (e.g., acoustic interference cancellation), adaptive noise cancellation (ANC), and/or the like without departing from the disclosure.

The AEC component 660 may output the isolated microphone audio signals Z'(n, k) to the FBF component 530 and the device 110 may process the isolated microphone audio signals Z'(n, k) to generate the output audio data 570, as described above with regard to FIG. 5. For example, when the event data 525 indicates that a microphone occlusion event is not detected, the device 110 may perform spatial processing and process the isolated microphone audio signals Z'(n, k) using the FBF component 530 and the ABF component 540. However, when the event data 525 indicates that a microphone occlusion event is detected, the device 110 may skip spatial processing and select the first isolated microphone audio signal $Z'_1(n, k)$ or the second isolated microphone audio signal $Z'_2(n, k)$ in order to generate the output audio data 570.

As described above, performing echo cancellation may influence how the occlusion event detector component 520 generates the event data 525. For example, the AEC component 660 may generate echo return loss enhancement (ERLE) data 665 and may send the ERLE data 665 to the occlusion event detector component 520. The occlusion event detector component 520 may include a divergence detector and may be configured to use the ERLE data 665 to detect the microphone occlusion events. For example, the occlusion event detector component 520 may use an output of the divergence detector as an input feature to a classifier or trained model configured to detect the microphone occlusion events, as described in greater detail below with regard to FIG. 8.

The AEC component 660 may determine the ERLE data by determining an echo return loss enhancement (ERLE) value, which corresponds to a ratio of a first power spectral density of the AEC input (e.g., microphone audio signals Z(n, k)) and a second power spectral density of the AEC output (e.g., isolated microphone audio signals Z'(n, k)), as shown below:

$$ERLE(n, k) = \frac{S_{dd}(n, k)}{S_{ee}(n, k) + \epsilon} \quad [1]$$

where n denotes a subband sample index (e.g., frame index), k denotes a subband bin index (e.g., frequency bin), ERLE (n, k) is the ERLE value for the nth subband sample index and the kth subband bin index, $S_{dd}$(n, k) is the power spectral density of the microphone audio signals Z(n, k) for the nth subband sample index and the kth subband bin index, $S_{ee}$(n, k) is the power spectral density of the isolated microphone audio signals Z'(n, k) for the nth subband sample index and the kth subband bin index, and E is a nominal value. As used herein, a power spectral density may be referred to as a power spectral density function, power spectral density data, and/or the like without departing from the disclosure. Thus, the first power spectral density may be referred to as first power spectral density data and the second power spectral density may be referred to as second power spectral density data, although the disclosure is not limited thereto.

When the ERLE value is above a first threshold value (e.g., 1.0), the system 100 may determine that the AEC component 660 is in a steady state condition (e.g., converged) and that the ILD values are reliable for performing microphone occlusion detection. When the ERLE value is below the first threshold value and/or below a second threshold value, however, the system 100 may determine that the AEC component 660 is diverging and that the ILD values are not reliable for performing microphone occlusion detection. Thus, the occlusion event detector component 520 may use the ERLE values to detect microphone occlusion events, although the disclosure is not limited thereto. Additionally or alternatively, while FIG. 6 illustrates an example of the AEC component 660 sending the ERLE data 665 to the occlusion event detector component 520, the disclosure is not limited thereto and the occlusion event detector component 520 may use any signal quality metric without departing from the disclosure.

Figure 7:
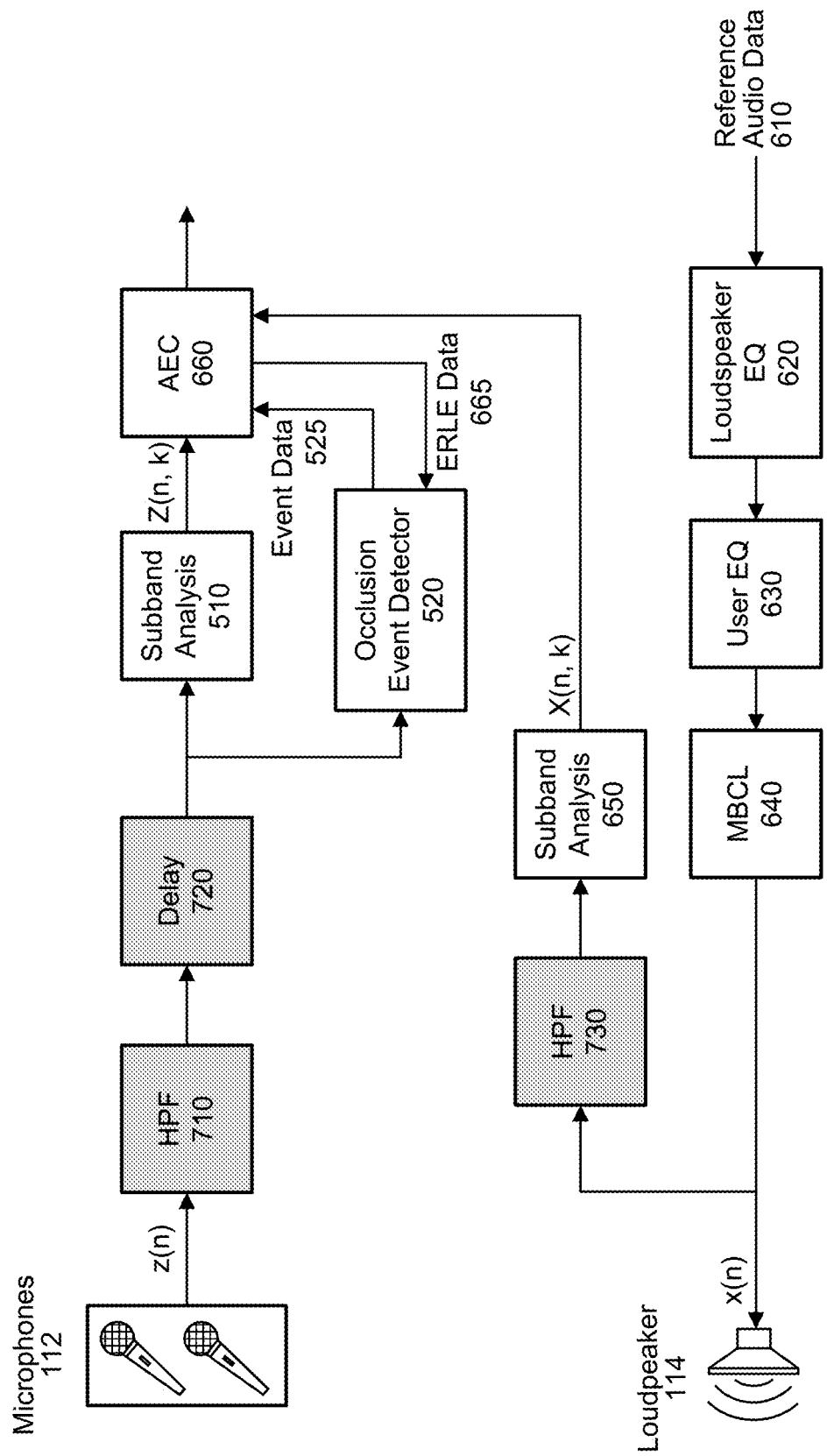
FIG. 7 illustrates examples of additional processing performed prior to performing microphone occlusion detection according to embodiments of the present disclosure.

FIG. 7 illustrates examples of additional processing performed prior to performing microphone occlusion detection according to embodiments of the present disclosure. As illustrated in FIG. 7, the device 110 may include additional components configured to perform additional processing that were not illustrated in FIGS. 5-6. For example, a detailed component diagram 700 shown in FIG. 7 illustrates that the device 110 may include a high pass filter (HPF) component 710 and/or a delay component 720 between the microphones 112a-112b and the subband analysis component 510. Similarly, the device 110 may include a high pass filter (HPF) component 730 between the loudspeaker 114 and the subband analysis component 650. Thus, the device 110 may perform high pass filtering and/or add a delay to the microphone audio signals z(n) before sending the microphone audio signals z(n) to the subband analysis component 510 and the occlusion event detector component 520.

Figure 8:
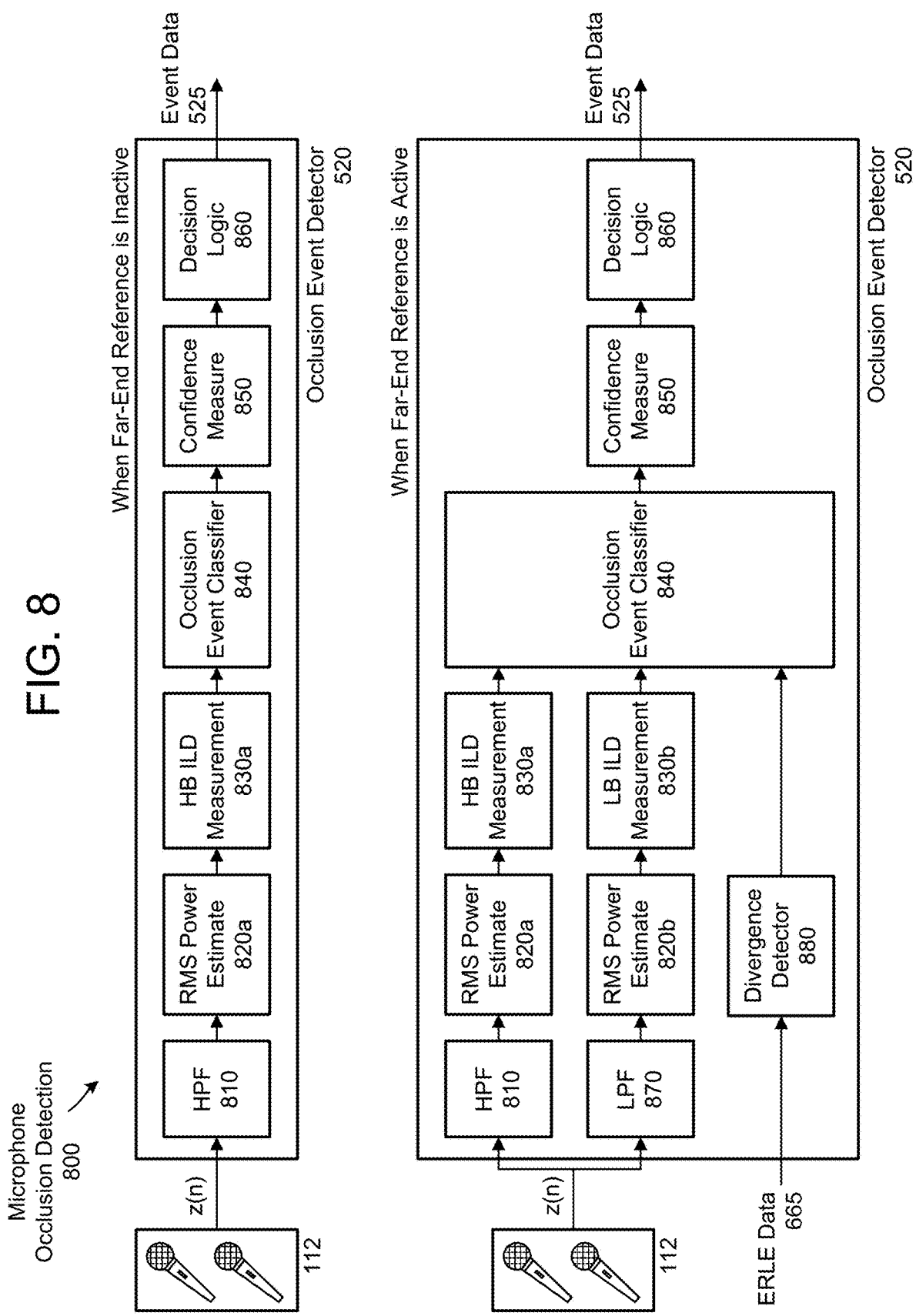
FIG. 8 illustrates an example component diagram for performing microphone occlusion detection using an occlusion event detector according to embodiments of the present disclosure.

FIG. 8 illustrates an example component diagram for performing microphone occlusion detection using an occlusion event detector according to embodiments of the present disclosure. As described above with regard to FIGS. 5-6, the device 110 may perform microphone occlusion detection differently depending on whether a far-end reference is active or inactive. For example, when the far-end reference signal is inactive (e.g., the device 110 is not generating output audio), the device 110 may perform microphone occlusion detection using only a highband (HB) input feature without departing from the disclosure. However, when the far-end reference signal is active (e.g., the device is generating output audio), the device 110 may perform microphone occlusion detection using the HB input feature, a lowband (LB) input feature, and/or additional input features without departing from the disclosure.

As illustrated in FIG. 8, when the far-end reference is inactive, the microphones 112 may generate microphone audio signals z(n), such as a first microphone audio signal from a first microphone 112a and a second microphone audio signal from a second microphone 112b. The device 110 may include a high-pass filter (HPF) component 810 configured to perform high-pass filtering to the microphone audio signals, a first root-mean-square (RMS) estimate component 820a configured to determine RMS power estimates using the HB portion of the microphone audio signals, and a HB interlevel difference (ILD) measurement component 830a configured to determine the HB ILD measurement value using the RMS power estimates. For example, the first RMS power estimate component 820a may determine a first RMS power estimate value for the HB portion of the first microphone audio signal and a second RMS power estimate value for the HB portion of the second microphone audio signal. The HB ILD measurement component 830a may determine the HB ILD measurement data (e.g., difference values) by calculating a difference between the first RMS power estimate value and the second RMS power estimate value.

The HB ILD measurement data may be used as an input feature for an occlusion event classifier component 840, as described in greater detail below with regard to FIG. 9. For example, based on the HB ILD measurement data, the occlusion event classifier component 840 may select a classification that indicates a type of occlusion event and generate microphone occlusion event classification data (e.g., classification data) indicating the occlusion event classification. After determining the occlusion event classification (e.g., generating the classification data), a confidence measure component 850 may determine a confidence measure value corresponding to the occlusion event classification, and a decision logic component 860 may generate event data 525 indicating whether an occlusion event is detected. For example, the occlusion event classification may distinguish between three or more classifications, such as mild occlusion, moderate occlusion, and firm occlusion. Based on the occlusion event classification, the device 110 may determine a confidence score indicating a likelihood that an occlusion event is present. Finally, the decision logic component 860 may use the confidence score to generate a binary output indicating whether an occlusion event is detected or not detected.

As illustrated in FIG. 8, when the far-end reference is active, the occlusion event detector component 520 may provide additional input features for the occlusion event classifier component 840 to determine an occlusion event classification. For example, the occlusion event detector component 520 may include the HPF component 810, the first RMS power estimate component 820a, and the HB ILD measurement component 830a to determine the HB ILD measurement data, as described above.

In addition, the occlusion event detector component 520 may include a low-pass filter (LPF) component 870 configured to perform low-pass filtering to the microphone audio signals, a second RMS estimate component 820b configured to determine RMS power estimates using the LB portion of the microphone audio signals, and a LB ILD measurement component 830b configured to determine the LB ILD measurement value using the RMS power estimates. For example, the second RMS power estimate component 820b may determine a third RMS power estimate value for the LB portion of the first microphone audio signal and a fourth RMS power estimate value for the LB portion of the second microphone audio signal. The LB ILD measurement component 830b may determine the LB ILD measurement data (e.g., difference values) by calculating a difference between the third RMS power estimate value and the fourth RMS power estimate value.

The HB ILD measurement data and the LB ILD measurement data may be used as input features for the occlusion event classifier component 840, as described in greater detail below with regard to FIG. 10. For example, based on the HB ILD measurement data and the LB ILD measurement data, the occlusion event classifier component 840 may select a classification that indicates a type of occlusion event and generate microphone occlusion event classification data (e.g., classification data) indicating the occlusion event classification. The disclosure is not limited thereto, however, and in some examples the occlusion event classifier component 840 may include additional input features without departing from the disclosure.

In addition to removing the echo signal and improving an audio quality of the output audio data, performing echo cancellation may influence how the occlusion event detector component 520 generates the event data 525. For example, when echo cancellation is converged (e.g., working correctly), the occlusion event detector component 520 may detect the microphone occlusion event based on the ILD measurement values described above. However, the device 110 may determine that the echo cancellation is diverging (e.g., not working correctly to estimate and remove the echo signal from the microphone audio signal) and may use this as an input feature to indicate that a microphone occlusion event is present.

For example, while performing echo cancellation, the device 110 may determine echo return loss enhancement (ERLE) data, such as an instantaneous ERLE value frame to frame. When the ERLE value is high, the device 110 may determine that the echo cancellation is converged and that the input features used by the classifier are reliable. However, when the ERLE value is low, the device 110 may determine that the echo cancellation is diverging and that the input features are not reliable. Thus, the device 110 may detect a divergence event and use the divergence event as a strong indicator of an occlusion event.

As illustrated in FIG. 8, the occlusion event detector component 520 may optionally include a divergence detector 880 configured to receive the ERLE data 665 generated by the AEC component 660 and perform divergence detection using the ERLE data 665. In some examples, the divergence detector 880 may generate divergence data indicating whether the AEC component 660 is converged or diverging and the occlusion event classifier component 840 may use the divergence data to select the occlusion event classification and generate the classification data, although the disclosure is not limited thereto. Thus, the device 110 may determine the occlusion event classification using the HB ILD measurement data, the LB ILD measurement data, the divergence data, and/or other input features. For example, the device 110 may determine the occlusion event classification based on the presence of a divergence event, using the HB ILD measurement data, using the LB ILD measurement data, and/or a combination thereof, although the disclosure is not limited thereto.

After determining the occlusion event classification, the confidence measure component 850 may determine the confidence measure value corresponding to the occlusion event classification, and the decision logic component 860 may generate the event data 525 indicating whether an occlusion event is detected. For example, the occlusion event classification may distinguish between three or more classifications, such as mild occlusion, moderate occlusion, and firm occlusion. Based on the occlusion event classification, the device 110 may determine a confidence score indicating a likelihood that an occlusion event is present. Finally, the decision logic component 860 may use the confidence score to generate a binary output indicating whether an occlusion event is detected or not detected.

Figure 9:
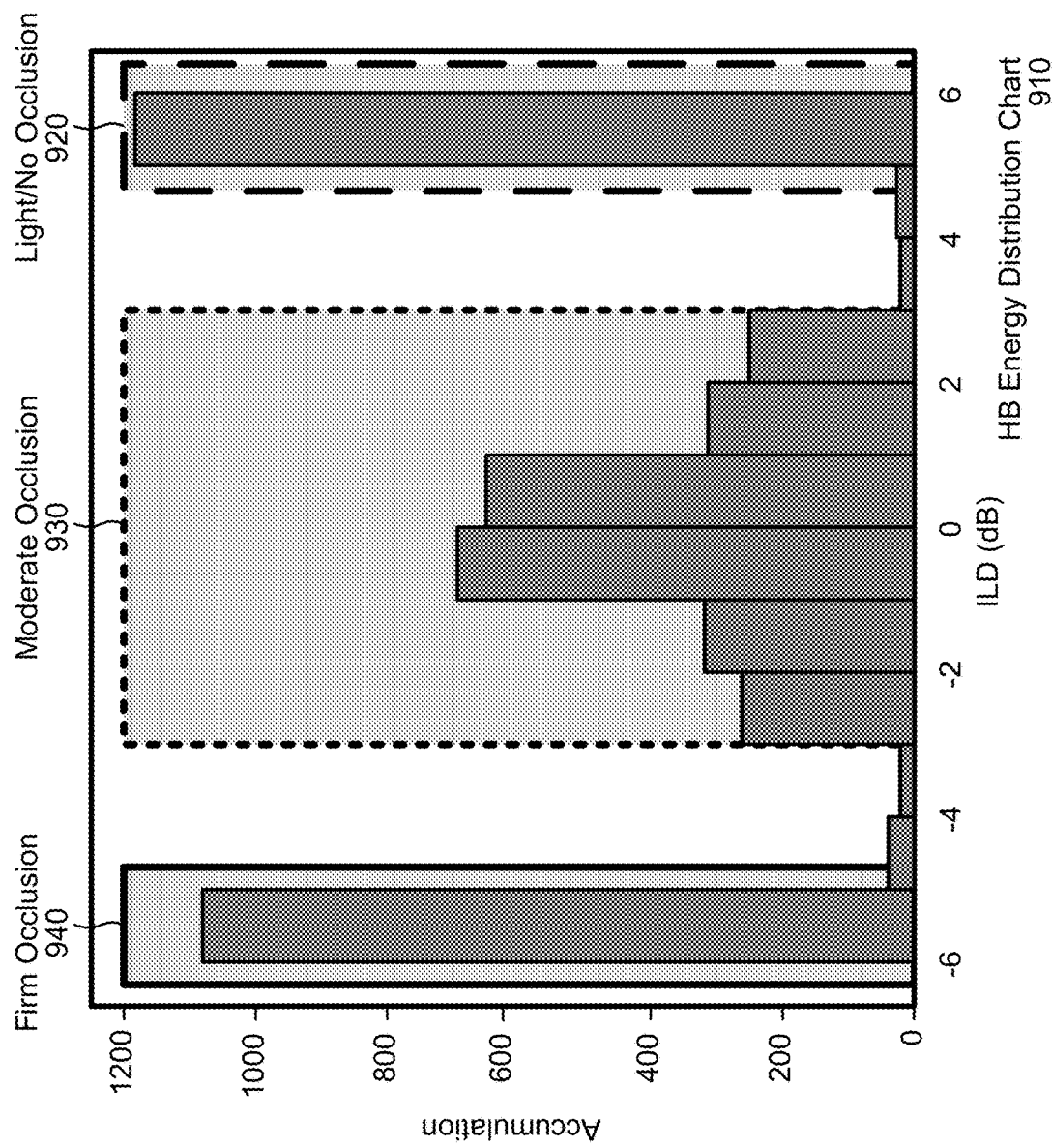
FIG. 9 illustrates an example of an energy distribution chart and performing microphone occlusion classification when a reference signal is inactive according to embodiments of the present disclosure.

FIG. 9 illustrates an example of an energy distribution chart and performing microphone occlusion classification when a reference signal is inactive according to embodiments of the present disclosure. As described above with regard to FIG. 8, when a far-end reference signal is inactive (e.g., the device 110 is not generating playback audio), the occlusion event detector component 520 may detect a microphone occlusion event based on a single input feature. For example, the occlusion event detector component 520 may apply a high-pass filter (HPF) to determine highband (HB) interlevel difference (ILD) measurement values between the two microphone audio signals Z(n, k).

FIG. 9 illustrates a highband (HB) energy distribution chart 910 that represents a plurality of HB ILD measurement values associated with test data. As illustrated in FIG. 9, a horizontal axis of the HB energy distribution chart 910 represents ILD measurement values in decibels (dB), while a vertical axis of the HB energy distribution chart 910 represents an accumulation (e.g., number of data points) associated with each of the ILD measurement values.

As illustrated in the HB energy distribution chart 910, the plurality of HB ILD measurement values are distributed in three separate clusters. For example, a first cluster includes HB ILD measurement values above a first threshold value (e.g., 4), a second cluster includes HB ILD measurement values below the first threshold value but above a second threshold value (e.g., −4), such that the second cluster is roughly centered on zero, and a third cluster includes HB ILD measurement values below the second threshold value. Thus, the occlusion event detector component 520 may separate the plurality of HB ILD measurement values into three separate classifications, with the first cluster corresponding to a first classification (e.g., light/no occlusion 920), the second cluster corresponding to a second classification (e.g., moderate occlusion 930), and the third cluster corresponding to a third classification (e.g., firm occlusion 940).

Figure 10:
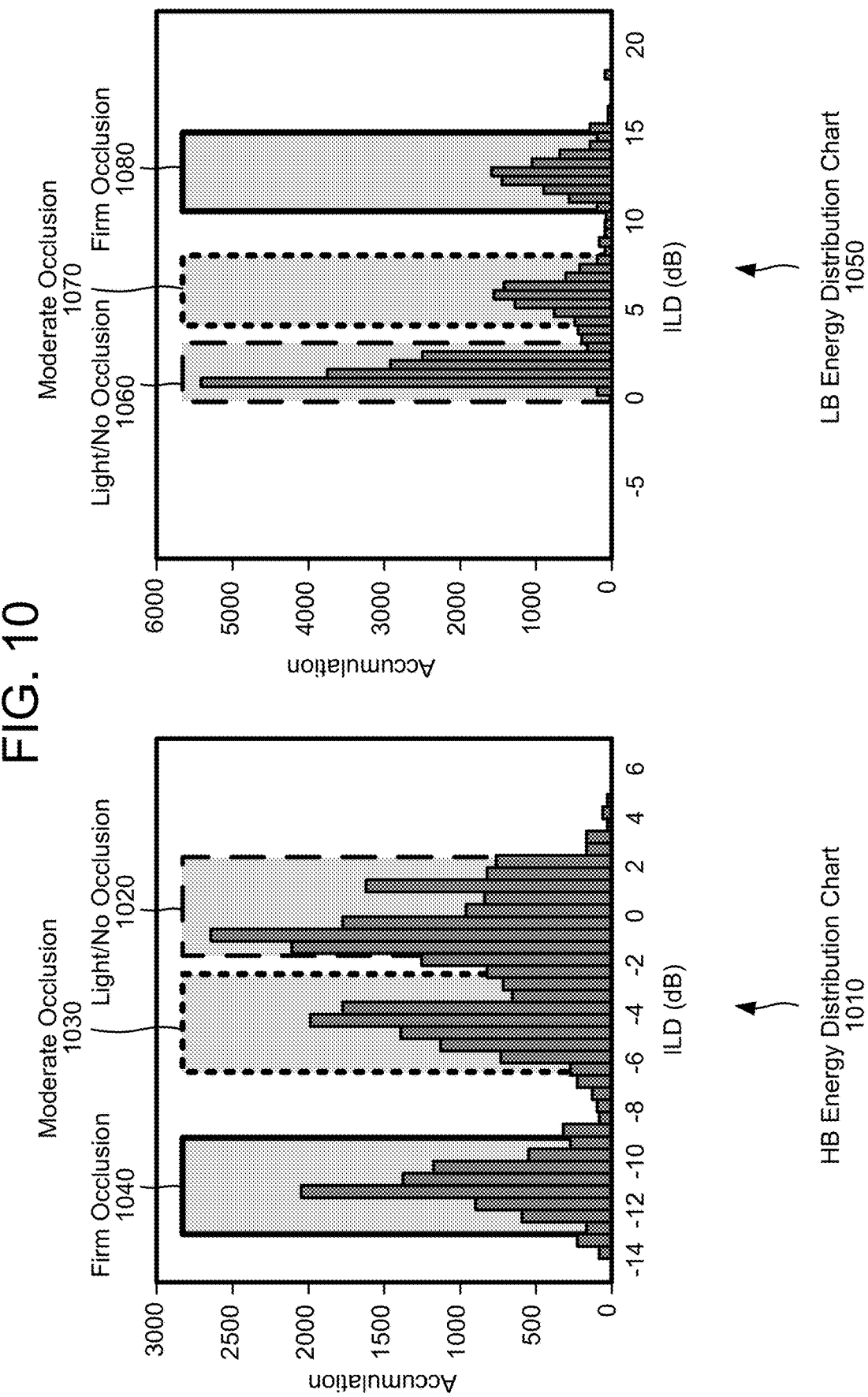
FIG. 10 illustrates an example of energy distribution charts and performing microphone occlusion classification when a reference signal is active according to embodiments of the present disclosure.

FIG. 10 illustrates an example of energy distribution charts and performing microphone occlusion classification when a reference signal is active according to embodiments of the present disclosure. As described above with regard to FIG. 8, when a far-end reference signal is active (e.g., the device 110 is generating playback audio), the occlusion event detector component 520 may detect a microphone occlusion event based on multiple input features. For example, the occlusion event detector component 520 may apply the HPF to determine the HB ILD measurement values between the two microphone audio signals Z(n, k), as described above with regard to FIG. 9, which may be used as first input features. In addition, the occlusion event detector component 520 may apply a low-pass filter (LPF)

to determine lowband (LB) ILD measurement values between the two microphone audio signals Z(n, k), which may be used as second input features.

FIG. 10 illustrates an example of a HB energy distribution chart 1010, which represents a first plurality of HB ILD measurement values associated with test data, as well as an example of a lowband (LB) energy distribution chart 1050, which represents a second plurality of LB ILD measurement values associated with the test data. As illustrated in FIG. 10, a horizontal axis of the HB energy distribution chart 1010 and the LB energy distribution chart 1050 represents ILD measurement values in decibels (dB), while a vertical axis of the HB energy distribution chart 1010 and the LB energy distribution chart 1050 represents an accumulation (e.g., number of data points) associated with each of the ILD measurement values.

As illustrated in FIG. 10, both the HB energy distribution chart 1010 and the LB energy distribution chart 1050 separate the ILD measurement values into three separate clusters or classifications. Thus, the occlusion event detector component 520 may be able to classify a type of microphone occlusion event based on either the HB ILD measurement values or the LB ILD measurement values without departing from the disclosure. However, by using both the HB ILD measurement values and the LB ILD measurement values as input features, the occlusion event detector component 520 may improve an accuracy of the classification.

As illustrated in the HB energy distribution chart 1010, the plurality of HB ILD measurement values are distributed in three separate clusters. For example, a first cluster includes HB ILD measurement values in a first range (e.g., between −2 and 2), a second cluster includes HB ILD measurement values in a second range (e.g., between −2 and −6), and a third cluster includes HB ILD measurement values in a third range (e.g., between −10 and −14). Thus, the occlusion event detector component 520 may separate the plurality of HB ILD measurement values into three separate classifications, with the first cluster corresponding to a first classification (e.g., light/no occlusion 1020), the second cluster corresponding to a second classification (e.g., moderate occlusion 1030), and the third cluster corresponding to a third classification (e.g., firm occlusion 1040).

As illustrated in the LB energy distribution chart 1050, the plurality of LB ILD measurement values are also distributed in three separate clusters. For example, a first cluster includes LB ILD measurement values in a first range (e.g., between 0 and 5), a second cluster includes LB ILD measurement values in a second range (e.g., between 5 and 10), and a third cluster includes LB ILD measurement values in a third range (e.g., between 10 and 15). Thus, the occlusion event detector component 520 may separate the plurality of LB ILD measurement values into three separate classifications, with the first cluster corresponding to a first classification (e.g., light/no occlusion 1060), the second cluster corresponding to a second classification (e.g., moderate occlusion 1070), and the third cluster corresponding to a third classification (e.g., firm occlusion 1080).

While not illustrated in FIG. 10, the occlusion event detector component 520 may use both the HB ILD measurement values and the LB ILD measurement values as input features to a classifier to further improve the accuracy of the classification. Additionally or alternatively, the occlusion event detector component 520 may include additional input features, such as ERLE value(s), an output of a divergence detector, and/or the like without departing from the disclosure, as described above with regard to FIG. 8.

Figure 11:
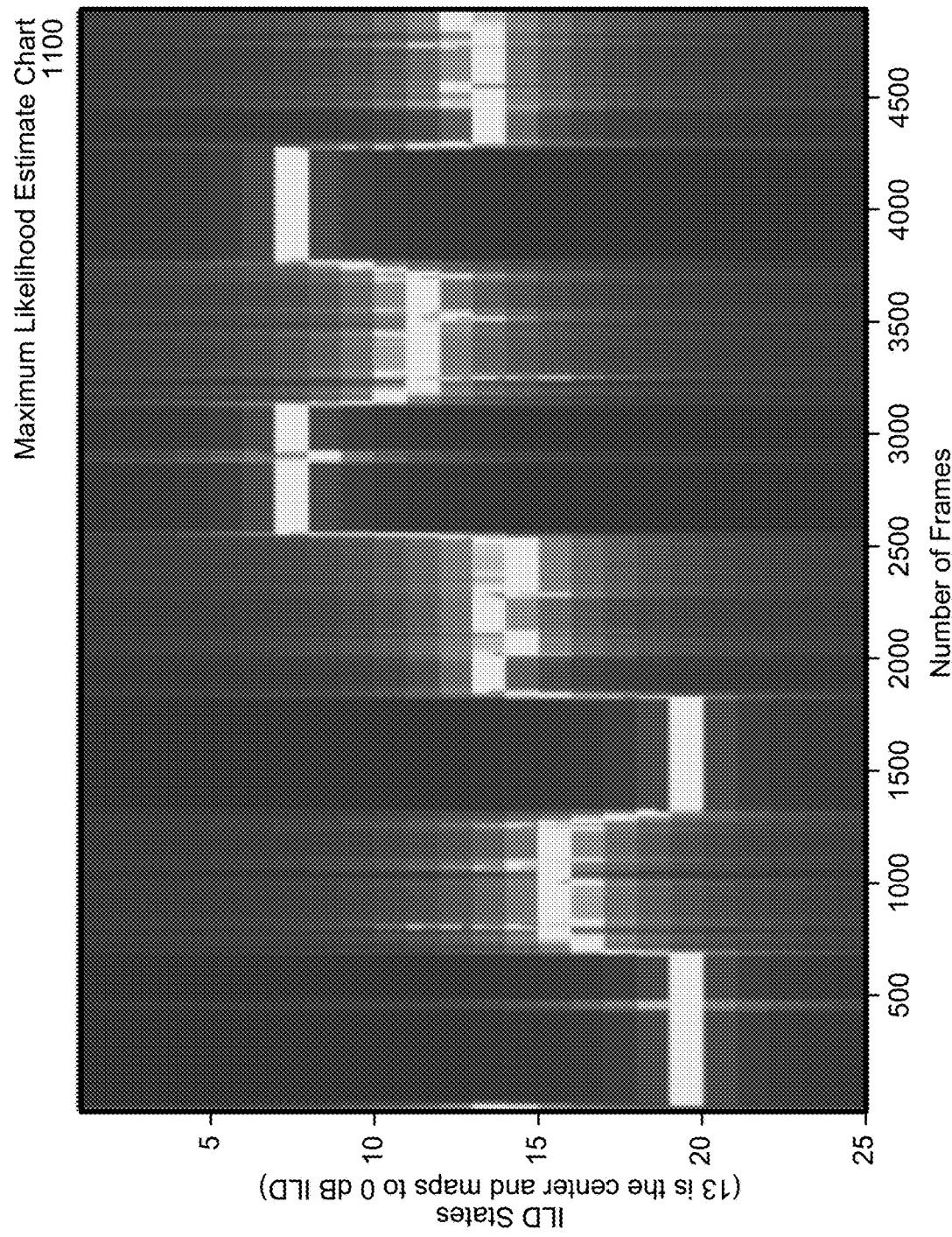
FIG. 11 illustrates an example of maximum likelihood estimates corresponding to different states according to embodiments of the present disclosure.

FIG. 11 illustrates an example of maximum likelihood estimates corresponding to different states according to embodiments of the present disclosure. As illustrated in FIG. 11, the occlusion event detector component 520 may detect a microphone occlusion event by determining a maximum likelihood estimate. For example, FIG. 11 illustrates an example of a maximum likelihood estimate chart 1100, which represents maximum likelihood estimate values over time.

As illustrated in FIG. 11, a horizontal axis of the maximum likelihood estimate chart 1100 may correspond to an audio frame, such that the maximum likelihood estimate chart 1100 illustrates the maximum likelihood estimate varying over time. In addition, a vertical axis of the maximum likelihood estimate chart 1100 may correspond to an ILD state, such that each maximum likelihood estimate corresponds to an ILD measurement value indicating an amount of occlusion. Thus, the maximum likelihood estimate chart 1100 illustrates examples of an amount of occlusion varying over time.

The ILD states range from a first ILD state (e.g., 1), which corresponds to an ILD measurement value of −12 dB, to a $25^{th}$ ILD state (e.g., 25), which corresponds to an ILD measurement value of 12 dB. Thus, the maximum likelihood estimate chart 1100 is centered on a thirteenth ILD state (e.g., 13), which corresponds to an ILD measurement value of 0 dB.

The ILD state and corresponding ILD measurement value indicate whether a microphone occlusion event is detected, an intensity of the microphone occlusion event, and/or which microphone is occluded. For example, first ILD states (e.g., below 13) indicate that the second microphone 112b is occluded to varying degrees, while second ILD states (e.g., above 13) indicate that the first microphone 112a is occluded to varying degrees. In some examples, the occlusion event detector component 520 may associate the thirteenth ILD state (e.g., 13) with the first classification (e.g., light/no occlusion). However, the disclosure is not limited thereto, and in other examples the occlusion event detector component 520 may associate a range of ILD states that includes the thirteenth ILD state with the first classification without departing from the disclosure. For example, the occlusion event detector component 520 may associate third ILD states (e.g., between 10 and 15) with the first classification, although the disclosure is not limited thereto.

While FIG. 11 illustrates an example of the occlusion event detector component 520 determining a maximum likelihood estimate, this is intended to conceptually illustrate a simple example and the disclosure is not limited thereto. In some examples, the occlusion event detector component 520 may instead process the input features (e.g., HB ILD measurement values, LB ILD measurement values, ERLE value(s), etc.) using a neural network, such as a deep neural network (DNN) model, without departing from the disclosure. For example, the occlusion event detector component 520 may use a neural network to perform classification (e.g., occlusion event classification), such that the occlusion event detector component 520 may include the neural network in place of the occlusion event classifier component 840.

Additionally or alternatively, the occlusion event detector component 520 may use a neural network to perform classification (e.g., generate classification data) and generate a confidence measure value, such that the occlusion event detector component 520 may include the neural network in place of the occlusion event classifier component 840 and the confidence measure component 850. The disclosure is not limited thereto, however, and in other examples the occlusion event detector component 520 may use a neural network to perform classification and/or generate the event data, such that the occlusion event detector component 520 may include the neural network in place of the occlusion event classifier component 840, the confidence measure component 850, and/or the decision logic component 860 without departing from the disclosure.

Figure 12A:
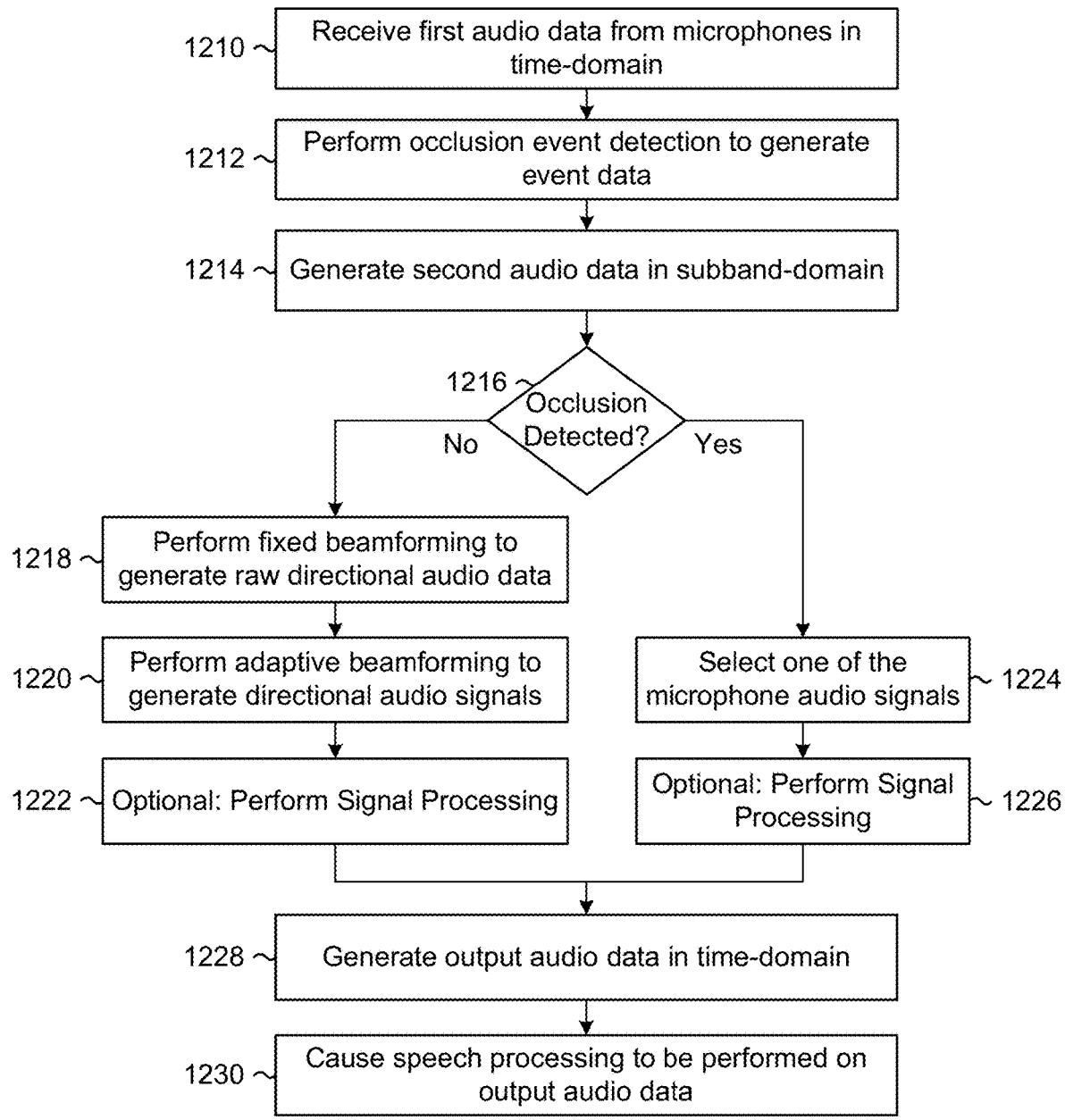
FIGS. 12A-12B are flowcharts conceptually illustrating example methods for performing microphone occlusion detection to generate event data and generating output audio data based on the event data according to embodiments of the present disclosure.
Figure 12B:
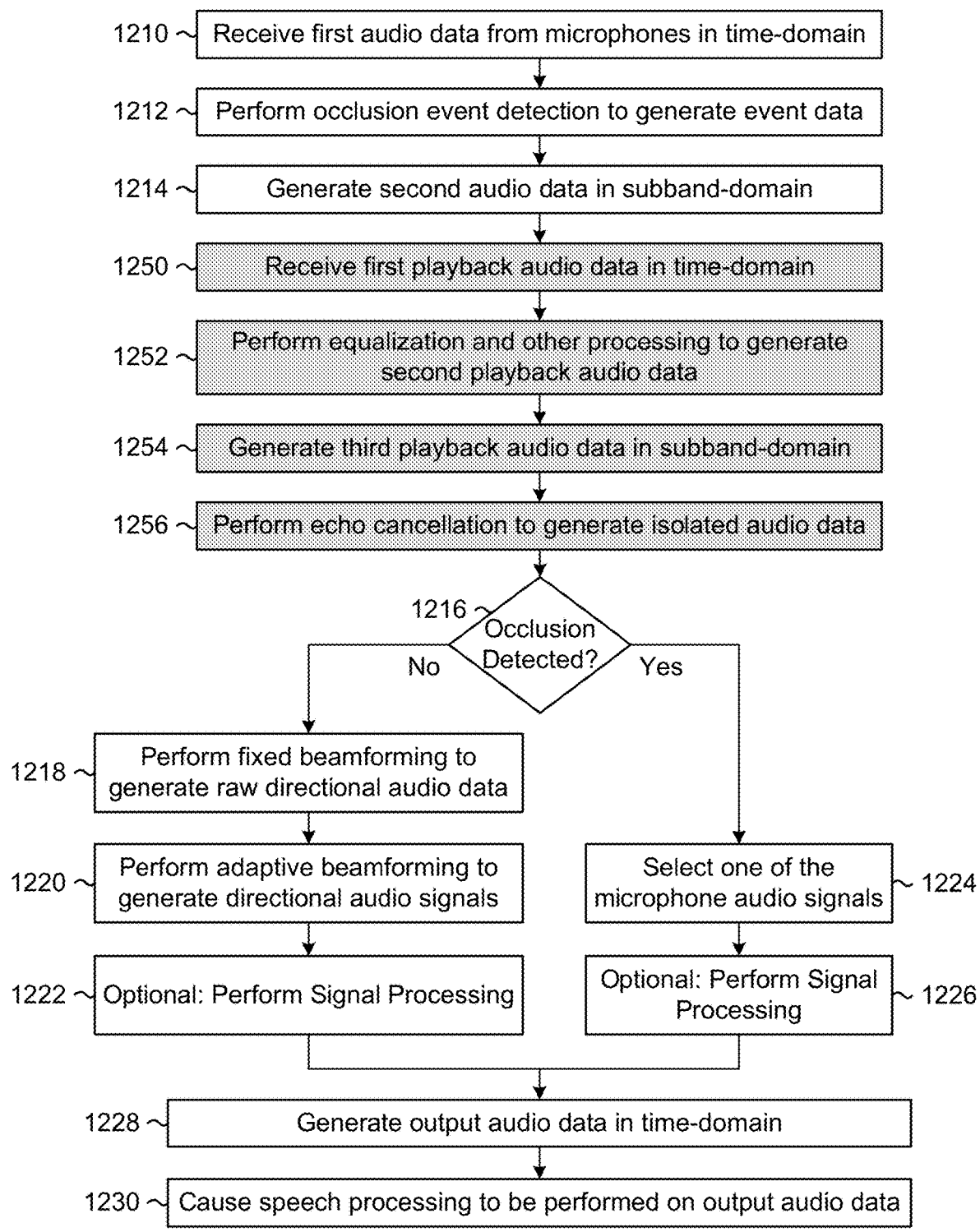

FIGS. 12A-12B are flowcharts conceptually illustrating example methods for performing microphone occlusion detection to generate event data and generating output audio data based on the event data according to embodiments of the present disclosure. In some examples, the device 110 may perform microphone occlusion detection and generate output audio data when a reference audio signal is not active (e.g., the device 110 is not generating output audio), which is illustrated in FIG. 12A. In other examples, the device 110 may perform microphone occlusion detection and generate output audio data when a reference audio signal is active (e.g., the device is generating output audio), which is illustrated in FIG. 12B.

As illustrated in FIG. 12A, the device 110 may receive (1210) first audio data from the microphones 112 in a time-domain and may perform (1212) occlusion event detection to generate event data, which will be described in greater detail below with regard to FIG. 13.

Using the first audio data, the device 110 may generate (1214) second audio data in a subband-domain. The device 110 may then process the second audio data differently depending on whether an occlusion event is detected. For example, if an occlusion event is not detected, the device 110 may perform spatial processing to generate output audio data, whereas if an occlusion event is detected, the device 110 may select one of the microphone audio signals to generate the output audio data.

As illustrated in FIG. 12A, the device 110 may determine (1216) whether an occlusion event is detected and if not, the device 110 may perform (1218) fixed beamforming to generate raw directional audio data, may perform (1220) adaptive beamforming processing to generate isolated directional audio signals, and may optionally perform (1222) signal processing. For example, the device 110 may perform fixed beamforming to generate raw directional audio data that includes a plurality of signals, such as first audio signal corresponding to a first direction, a second audio signal corresponding to a second direction, and so on. In some examples, in step 1220 the device 110 may select a first number of target signals and a second number of reference signals from the plurality of signals. For example, the device 110 may select two target signals from the plurality of signals, along with two reference signals for each of the target signals (e.g., first reference signals for a first target signal and second reference signals for a second target signal), although the disclosure is not limited thereto. The device 110 may then perform adaptive beamforming processing by subtracting the first reference signals from the first target signal to generate a first isolated directional audio signal and subtracting the second reference signals from the second target signal to generate a second isolated directional audio signal. In some examples, the device 110 may optionally perform beam merging to generate the output audio data. For example, the device 110 may perform the adaptive beamforming processing in step 1222 to generate two isolated directional audio signals and may perform beam merging to combine the two isolated directional audio signals and generate the output audio data in the subband-domain.

If the device 110 determines that an occlusion event is detected in step 1216, the device 110 may select (1224) one of the microphone audio signals based on the event data and may optionally perform (1226) signal processing. For example, if the event data indicates that the first microphone 112a is occluded, the device 110 may select the second microphone audio signal and generate output audio data using the second microphone audio signal. The signal processing performed on the microphone signal in step 1226 may be different than the signal processing performed on the directional audio signal(s) in step 1222, although the disclosure is not limited thereto Depending on whether an occlusion event is detected, the device 110 may generate (1228) output audio data in the time-domain either using the isolated directional audio signals or the selected microphone audio signal. For example, the device 110 may perform subband synthesis to convert from the subband-domain to the time-domain to generate the output audio data.

The device 110 may cause (1230) speech processing to be performed on the output audio data. In some examples, the device 110 may send the output audio data to the remote system 120 to perform speech processing. However, the disclosure is not limited thereto, and in other examples the device 110 may perform speech processing and/or the device 110 may send the output audio data to the local SLU device 105 to perform speech processing without departing from the disclosure.

FIG. 12B illustrates an example of performing microphone occlusion detection and generating output audio data when a reference audio signal is active (e.g., the device is generating output audio). As many of the steps illustrated in FIG. 12B are described in greater detail above with regard to FIG. 12A, a redundant description is omitted.

As illustrated in FIG. 12B, the device 110 may receive (1210) the first audio data, may perform (1212) occlusion event detection to generate event data, and may generate (1214) the second audio data. As the device 110 is generating output audio, however, the device 110 may perform echo cancellation prior to performing spatial processing. For example, the device 110 may receive (1250) first playback audio data in the time-domain and may perform (1252) equalization and other processing to generate second playback audio data. To generate the output audio, the device 110 may send the second playback audio data to a loudspeaker 114.

As the loudspeaker 114 is generating output audio, the microphones 112 may recapture a portion of the output audio as an echo signal. To remove the echo signal, the device 110 may perform echo cancellation using the second playback audio data. For example, the device 110 may generate (1254) third playback audio data in the subband-domain and may perform (1256) echo cancellation to generate isolated audio data, as described in greater detail above with regard to FIG. 6.

Figure 13:
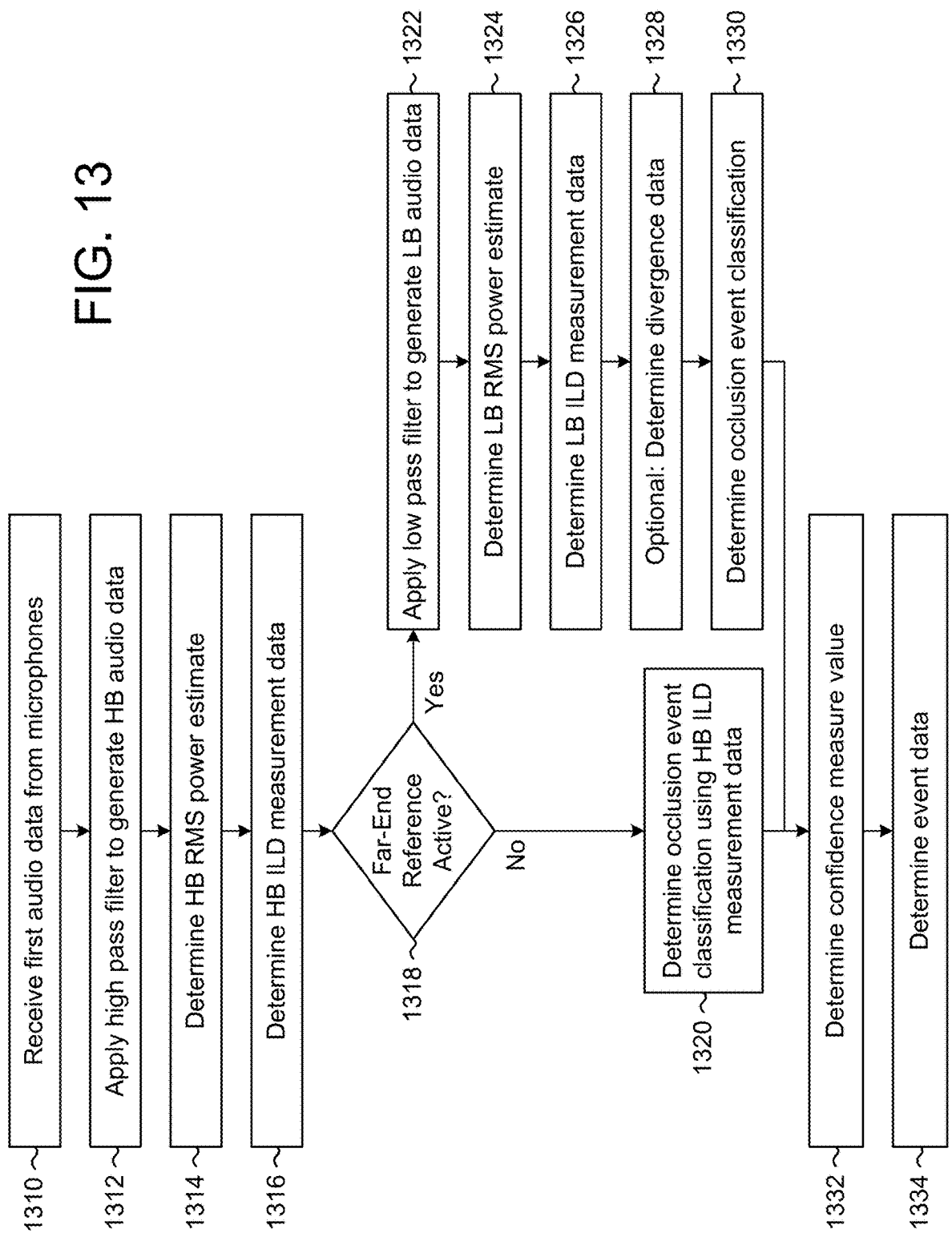
FIG. 13 is a flowchart conceptually illustrating an example method for performing microphone occlusion detection to generate event data according to embodiments of the present disclosure.

FIG. 13 is a flowchart conceptually illustrating an example method for performing microphone occlusion detection to generate event data according to embodiments of the present disclosure. As illustrated in FIG. 13, the device 110 may receive (1310) first audio data from the microphones 112, such as a first microphone audio signal from a first microphone 112a and a second microphone audio signal from a second microphone 112b.

The device 110 may apply (1312) a high pass filter (HPF) to generate highband (HB) audio data, may determine (1314) a HB root-mean-square (RMS) power estimate value, and may determine (1316) HB interlevel difference (ILD) measurement data between the first microphone audio signal and the second microphone audio signal. For example, the device 110 may determine the ILD measurement value within the highband frequency range and use this ILD measurement value as an input feature to determine a classification of the occlusion event.

The device 110 may determine (1318) whether a far-end reference signal is active and, if not, the device 110 may determine (1320) an occlusion event classification and generate microphone occlusion event classification data (e.g., classification data) indicating the occlusion event classification using the HB ILD measurement data as an input feature. For example, when the device 110 is not generating output audio, the device 110 may use only the HB ILD measurement data to determine the occlusion event classification.

If the device 110 determines that the far-end reference signal is active in step 1318, the device 110 may apply (1322) a low pass filter (LPF) to generate lowband (LB) audio data, may determine (1324) a LB RMS power estimate value, and may determine (1326) LB ILD measurement data between the first microphone audio signal and the second microphone audio signal. For example, the device 110 may determine the ILD measurement value within the lowband frequency range and use this ILD measurement value as an input feature to determine a classification of the occlusion event.

In some examples, the device 110 may optionally determine (1328) divergence data associated with echo cancellation, as described above with regard to FIGS. 6-8. For example, while performing echo cancellation, the device 110 may determine echo return loss enhancement (ERLE) data, such as an instantaneous ERLE value frame to frame. When the ERLE value is high, the device 110 may determine that the echo cancellation is converged and that the input features used by the classifier are reliable. However, when the ERLE value is low, the device 110 may determine that the echo cancellation is diverging and that the input features are not reliable. Thus, the device 110 may detect a divergence event and use the divergence event as a strong indicator of an occlusion event.

The device 110 may determine (1330) occlusion event classification and generate microphone occlusion event classification data (e.g., classification data) indicating the occlusion event classification using the HB ILD measurement data, the LB ILD measurement data, the divergence data, and/or other input features. For example, the device 110 may determine the occlusion event classification based on the presence of a divergence event, using the HB ILD measurement data, using the LB ILD measurement data, and/or a combination thereof, although the disclosure is not limited thereto.

After determining the occlusion event classification and generating classification data either in step 1320 or in step 1330, the device 110 may determine (1332) a confidence measure value using the occlusion event classification (e.g., classification data) and may determine (1334) event data indicating whether an occlusion event is detected.

Figure 14:
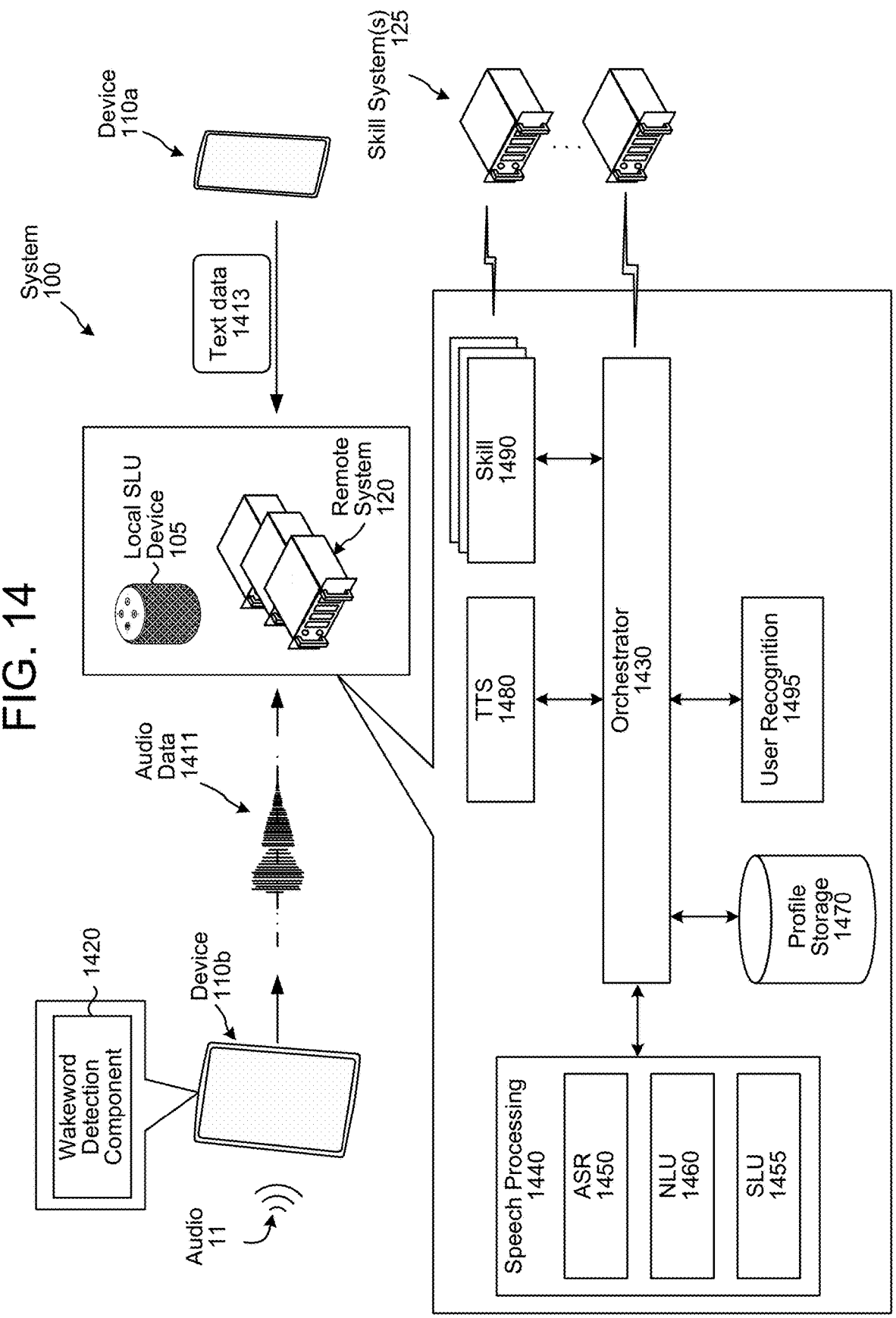
FIG. 14 is a conceptual diagram of components of the system performing natural language processing.

The system 100 may operate using various components as described in FIG. 14. The various components may be located on a same or different physical devices. Communication between various components may occur directly or across a network(s) 199.

An audio capture component(s), such as a microphone or array of microphones of the device 110a, captures audio 11. The device 110a processes audio data, representing the audio 11, to determine whether speech is detected. The device 110a may use various techniques to determine whether audio data includes speech. In some examples, the device 110a may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110a may implement a limited classifier configured to distinguish speech from background noise. The classifier may be implemented by techniques such as linear classifiers, support vector machines, and decision trees. In still other examples, the device 110a may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110a may use a wakeword detection component 1420 to perform wakeword detection to determine when a user intends to speak an input to the remote system 120. As indicated previously, the device 110a may be configured to detect various wakewords, with each wakeword corresponding to a different assistant. In at least some examples, a wakeword may correspond to a name of an assistant. An example wakeword/assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 1420 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1420 may be built on deep neural network (DNN)/recursive neural network (RNN) structures directly, without HMI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once a wakeword is detected, the device 110a may "wake" and begin transmitting audio data 1411, representing the audio 11, to the remote system 120. The audio data 1411 may include data corresponding to the detected wakeword, or the device 110*a* may remove the portion of the audio corresponding to the detected wakeword prior to sending the audio data 1411 to the remote system 120.

The remote system 120 may include an orchestrator component 1430 configured to receive the audio data 1411 (and optionally and assistant identifier) from the device 110*a*. The orchestrator component 1430 may send the audio data 1411 to a speech processing component 1440. In some examples, the speech processing component 1440 may include an ASR component 1450 and an NLU component 1460 that are configured to process the audio data 1411 to generate NLU data. However, the disclosure is not limited thereto and in other examples, the speech processing component 1440 may include a spoken language understanding (SLU) component 1455 that is configured to process the audio data 1411 to generate the NLU data. Additionally or alternatively, the speech processing component 1440 may include the ASR component 1450, the NLU component 1460 and/or the SLU component 1455 without departing from the disclosure.

The ASR component 1450 transcribes the audio data 1411 into ASR results data (e.g., text data) include one or more ASR hypotheses (e.g., in the form of an N-best list). Each ASR hypothesis may represent a different likely interpretation of the speech in the audio data 1411. Each ASR hypothesis may be associated with a score representing a confidence of ASR processing performed to generate the ASR hypothesis with which the score is associated.

The ASR component 1450 interprets the speech in the audio data 1411 based on a similarity between the audio data 1411 and pre-established language models. For example, the ASR component 1450 may compare the audio data 1411 with models for sounds (e.g., subword units, such as phonemes, etc.) and sequences of sounds to identify words that match the sequence of sounds of the speech represented in the audio data 1411.

In some examples, the device 110*b* may receive a typed natural language input. The device 110*b* may generate text data 1413 representing the typed natural language input. The device 110*a* may send the text data 1413 to the remote system 120, wherein the text data 1413 is received by the orchestrator component 1430. However, the disclosure is not limited thereto and in other examples, the device 110*b* may send audio data 1411 to the remote system 120 as described above with regard to device 110*a* without departing from the disclosure.

The orchestrator component 1430 may send text data (e.g., text data output by the ASR component 1450 or the text data 1413 received from the device 110*a*) to an NLU component 1460.

The orchestrator component 1430 (or other component) may also track a dialog and dialog state across multiple utterances. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering skill and may prompt the user several times for several utterances to obtain the data from the user needed to complete the pizza order (e.g., toppings, time of delivery, any additional items to order, etc.). Another example may be the user invoking a quiz game skill, where multiple questions are asked of the user and the user responds with utterances that are processed by the system and whose text data is sent to the quiz show skill. Each utterance of the dialog may have a unique utterance ID but may also share a common dialog ID so that the system can process incoming audio data knowing that it is associated with a particular dialog.

The remote system 120 may store dialog data indicating the dialog ID and a variety of other information, including input audio data representing an utterance, output audio data representing synthesized speech, first text data corresponding to the utterance, second text data corresponding to the synthesized speech, and/or other information without departing from the disclosure. As used herein, an exchange refers to at least one input and at least one output responsive to the input. Thus, a single exchange may include one or more inputs and one or more outputs, and the dialog may correspond to two or more exchanges without departing from the disclosure. For ease of illustration, an exchange may be referred to as an interaction without departing from the disclosure.

The NLU component 1460 attempts to make a semantic interpretation of the phrase(s) or statement(s) represented in the received text data. That is, the NLU component 1460 determines one or more meanings associated with the phrase(s) or statement(s) represented in the text data based on words represented in the text data. The NLU component 1460 determines an intent representing an action that a user desires be performed as well as pieces of the text data that allow a device (e.g., the device (110*a*/110*b*), local SLU device 105, the remote system 120, a skill system(s) 125, etc.) to execute the intent. For example, if the text data corresponds to "play Adele music," the NLU component 1460 may determine a <PlayMusic> intent and may identify "Adele" as an artist. For further example, if the text data corresponds to "what is the weather," the NLU component 1460 may determine an <OutputWeather> intent. In another example, if the text data corresponds to "turn off the lights," the NLU component 1460 may determine a <DeactivateLight> intent.

The NLU component 1460 may output NLU results data (which may include tagged text data, indicators of intent, etc.) to the orchestrator component 1430. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 1460 in the processing performed to generate the NLU hypothesis associated with the confidence value.

As described above, the remote system 120 may perform speech processing using two different components (e.g., the ASR component 1450 and the NLU component 1460). One skilled in the art will appreciate that the remote system 120, in at least some examples, may implement a spoken language understanding (SLU) component 1455 that is configured to process audio data 1411 to generate NLU results data without departing from the disclosure.

In some examples, the SLU component 1455 may be equivalent to the ASR component 1450 and the NLU component 1460. While the SLU component 1455 may be equivalent to a combination of the ASR component 1450 and the NLU component 1460, the SLU component 1455 may process audio data 1411 and directly generate the NLU results data, without an intermediate step of generating text data (as does the ASR component 1450). As such, the SLU component 1455 may take audio data 1411 representing speech and attempt to make a semantic interpretation of the speech. That is, the SLU component 1455 may determine a meaning associated with the speech and then implement that meaning. For example, the SLU component 1455 may interpret audio data 1411 representing speech from the user 5 in order to derive a desired action. In some examples, the SLU component 1455 outputs a most likely NLU hypothesis, or multiple NLU hypotheses in the form of a lattice or an N-best list with individual NLU hypotheses corresponding to confidence scores or other scores (such as probability scores, etc.).

The orchestrator component 1430 may send the NLU results to an associated skill component 1490. If the NLU results include multiple NLU hypotheses, the orchestrator component 1430 may send a portion of the NLU results corresponding to the top scoring NLU hypothesis to a skill component 1490 associated with the top scoring NLU hypothesis.

A "skill" or "skill component" may be software running on the remote system 120 that is akin to a software application running on a traditional computing device. That is, a skill component 1490 may enable the remote system 120 to execute specific functionality in order to perform one or more actions (e.g., provide information to a user, display content to a user, output music, or perform some other requested action). The remote system 120 may be configured with more than one skill component 1490. For example, a weather skill component may enable the remote system 120 to provide weather information, a ride sharing skill component may enable the remote system 120 to schedule a trip with respect to a ride sharing service, a restaurant skill component may enable the remote system 120 to order food with respect to a restaurant's online ordering system, a communications skill component may enable the system to perform messaging or multi-endpoint communications, etc. A skill component 1490 may operate in conjunction between the remote system 120 and other devices such as the device 110, a local SLU device 105, and/or skill system(s) 125 in order to complete certain functions. Inputs to a skill component 1490 may come from various interactions and input sources.

The functionality described herein as a skill or skill component may be referred to using many different terms, such as an action, bot, app, application, speechlet or the like. A skill component 1490 may include hardware, software, firmware, or the like that may be dedicated to the particular skill component 1490 or shared among different skill components 1490. A skill component 1490 may be part of the remote system 120 (as illustrated in FIG. 14) or may be located at whole (or in part) with one or more separate systems. Unless expressly stated otherwise, reference to a skill, skill device, or skill component may include a skill component operating within the remote system 120 (for example as skill component 1490) and/or skill component operating within a system separate from the remote system 120.

A skill component 1490 may be configured to perform one or more actions. A skill may enable a skill component 1490 to execute specific functionality in order to provide data or produce some other output requested by a user. A particular skill component 1490 may be configured to execute more than one skill. For example, a weather skill may involve a weather skill component providing weather information to the remote system 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 1490 may implement different types of skills and may optionally be in communication with one or more skill system(s) 125. The skill system(s) 125 may each correspond to a particular skill component 1490 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 1490 or a skill system(s) 125 may provide output text data responsive to the present user command.

The remote system 120 may communicate with one or more skill system(s) 125. A skill system(s) 125 may be configured to execute with respect to NLU results data. For example, for NLU results data including a <GetWeather> intent, a weather skill system may determine weather information for a geographic location represented in a user profile or corresponding to a location of the device 110 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system(s) 125 may operate in conjunction between the remote system 120 and other devices, such as the device 110, in order to complete certain functions. Inputs to a skill system(s) 125 may come from speech processing interactions or through other interactions or input sources.

A skill system(s) 125 may be associated with a domain. A non-limiting list of illustrative domains includes a smart home domain, a music domain, a video domain, a flash briefing domain, a shopping domain, and/or a custom domain.

The remote system 120 may include a TTS component 1480. The TTS component 1480 may generate audio data (e.g., synthesized speech) from text data using one or more different methods. Text data input to the TTS component 1480 may come from a skill system(s) 125, the orchestrator component 1430, or another component of the system 100.

In one method of synthesis called unit selection, the TTS component 1480 matches text data against a database of recorded speech. The TTS component 1480 selects matching units of recorded speech and concatenates the units together to form audio data. In another method of synthesis called parametric synthesis, the TTS component 1480 varies parameters such as frequency, volume, and noise to generate audio data including an artificial speech waveform. Parametric synthesis uses a computerized voice generator, sometimes called a vocoder.

The remote system 120 may include a user recognition component 1495. In at least some examples, the user recognition component 1495 may be implemented as a skill system(s) 125.

The user recognition component 1495 may recognize one or more users using various data. The user recognition component 1495 may take as input the audio data 1411 and/or the text data 1413. The user recognition component 1495 may perform user recognition (e.g., user recognition processing) by comparing speech characteristics, in the audio data 1411, to stored speech characteristics of users. The user recognition component 1495 may additionally or alternatively perform user recognition by comparing biometric data (e.g., fingerprint data, iris data, etc.), received by the remote system 120 in correlation with a natural language input, to stored biometric data of users. The user recognition component 1495 may additionally or alternatively perform user recognition by comparing image data (e.g., including a representation of at least a feature of a user), received by the remote system 120 in correlation with a natural language input, with stored image data including representations of features of different users. The user recognition component 1495 may perform other or additional user recognition processes, including those known in the art. For a particular natural language input, the user recognition component 1495 may perform processing with respect to stored data of users associated with the device 110 that captured the natural language input.

The user recognition component 1495 determines whether a natural language input originated from a particular user. For example, the user recognition component 1495 may generate a first value representing a likelihood that a natural language input originated from a first user, a second value representing a likelihood that the natural language input originated from a second user, etc. The user recognition component 1495 may also determine an overall confidence regarding the accuracy of user recognition operations.

The user recognition component 1495 may output a single user identifier corresponding to the most likely user that originated the natural language input. Alternatively, the user recognition component 1495 may output multiple user identifiers (e.g., in the form of an N-best list) with respective values representing likelihoods of respective users originating the natural language input. The output of the user recognition component 1495 may be used to inform NLU processing, processing performed by a skill system(s) 125, as well as processing performed by other components of the remote system 120 and/or other systems.

The remote system 120 may include profile storage 1470. The profile storage 1470 may include a variety of information related to individual users, groups of users, devices, etc. that interact with the remote system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information. Data of a profile may additionally or alternatively include information representing a preferred assistant to respond to natural language inputs corresponding to the profile.

The profile storage 1470 may include one or more user profiles. Each user profile may be associated with a different user identifier. Each user profile may include various user-identifying information. Each user profile may also include preferences of the user. Each user profile may include one or more device identifiers, representing one or more devices registered to the user. Each user profile may include identifiers of skill system(s) 125 that the user has enabled. When a user enables a skill system(s) 125, the user is providing the remote system 120 with permission to allow the skill system(s) 125 to execute with respect to the user's natural language inputs. If a user does not enable a skill system(s) 125, the remote system 120 may not invoke the skill system(s) 125 to execute with respect to the user's natural language inputs.

The profile storage 1470 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may include one or more device profiles corresponding to one or more devices associated with the group profile.

The profile storage 1470 may include one or more device profiles. Each device profile may be associated with a different device identifier. A device profile may include various device identifying information. A device profile may also include one or more user identifiers, corresponding to one or more user profiles associated with the device profile. For example, a household device's profile may include the user identifiers of users of the household.

While the above description refers to an example in which the remote system 120 performs speech processing for the device 110*a*, the disclosure is not limited thereto. In some examples, the device 110*a* may perform some level of speech processing locally on the device 110*a* without departing from the disclosure. For example, the device 110*a* may include some or all of the components illustrated in FIG. 14 and may be configured to perform some or all of the steps described above with regard to the remote system 120. Thus, the system 100 may perform speech processing using the device 110, the remote system 120, and/or a combination thereof (e.g., perform some steps using the device 110 and other steps using the remote system 120) without departing from the disclosure.

Additionally or alternatively, the local SLU device 105 may perform some level of speech processing locally without departing from the disclosure. For example, the local SLU device 105 may include some or all of the components illustrated in FIG. 14 and may be configured to perform some or all of the steps described above with regard to the remote system 120. Thus, the system 100 may perform speech processing using the device 110, the local SLU device 105, the remote system 120, and/or a combination thereof (e.g., perform some steps using the local SLU device 105 and other steps using the remote system 120) without departing from the disclosure.

Figure 15:
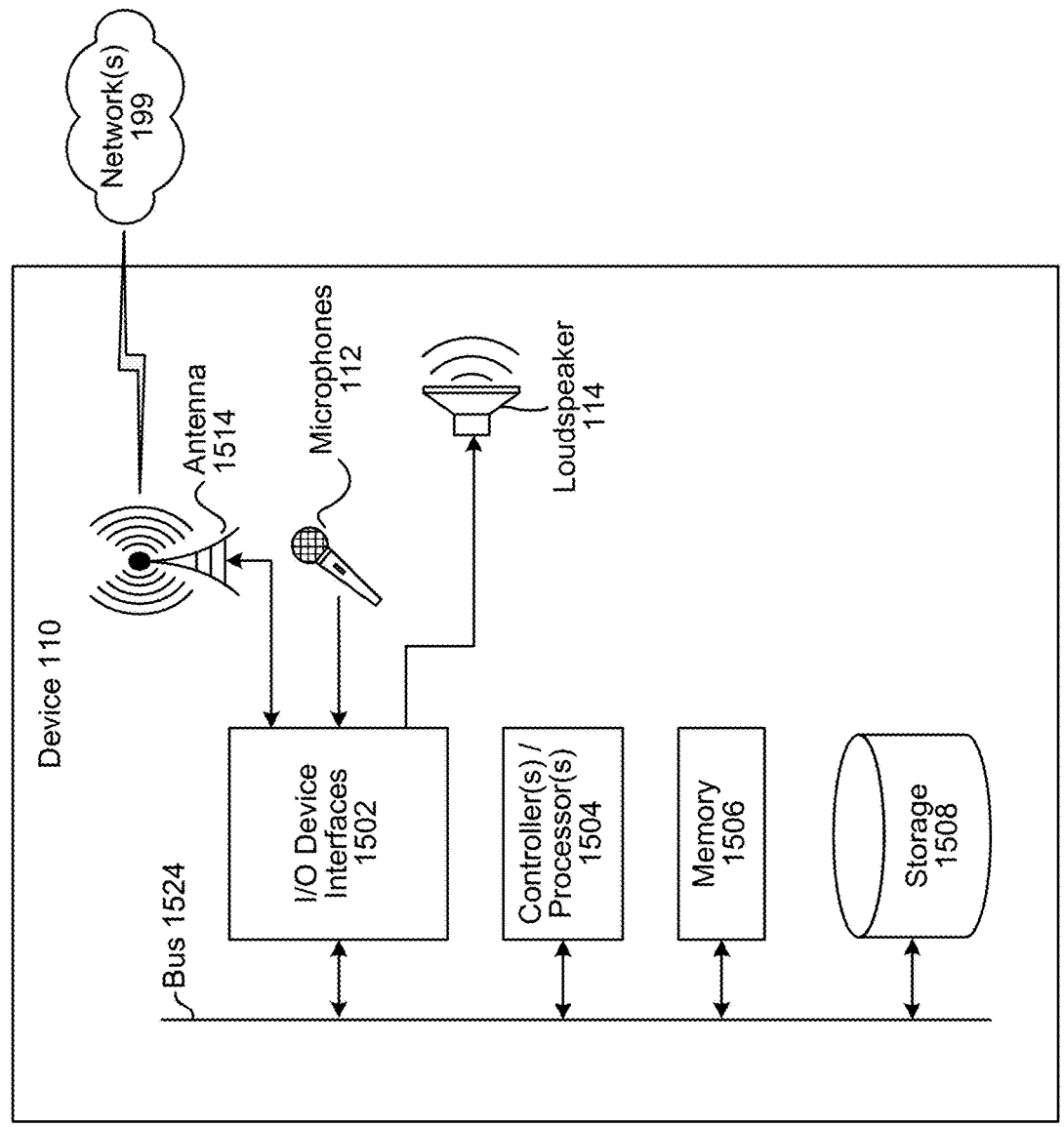
FIG. 15 is a block diagram conceptually illustrating example components of a device, according to embodiments of the present disclosure.
Figure 16:
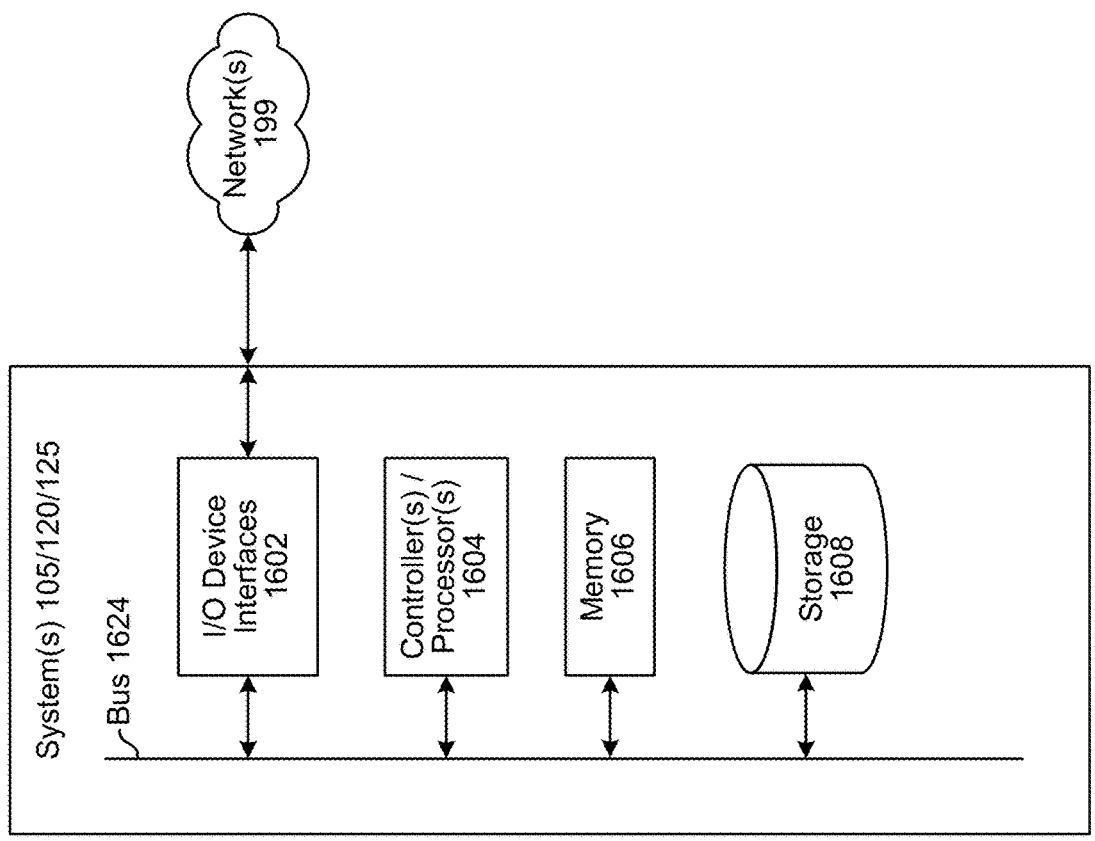
FIG. 16 is a block diagram conceptually illustrating example components of a system, according to embodiments of the present disclosure.

FIG. 15 is a block diagram conceptually illustrating a device 110 configured to perform microphone occlusion detection. FIG. 16 is a block diagram conceptually illustrating example components of a remote device, such as the local SLU device 105, the remote system 120, and/or the skill system(s) 125. In operation, the system 100 may include computer-readable and computer-executable instructions that reside on the device 110 and/or the system 105/120/125, as will be discussed further below. In addition, multiple devices 110 and/or multiple systems 105/120/125 may be included in the system 100 of the present disclosure without departing from the disclosure.

The remote system 120 and/or the skill system(s) 125 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/ components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The remote system 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/105/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/105/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/105/120/125) may also be connected to removable or external non-volatile memory and/or storage (such as a removable memory card, memory key drive, networked storage, etc.) through respective input/output device interfaces (1502/1602).

Each device (110/105/120/125) may include components that may comprise processor-executable instructions stored in storage (1508/1608) to be executed by controller(s)/processor(s) (1504/1604) (e.g., software, firmware, hardware, or some combination thereof). For example, components of the device (110/105/120/125) may be part of a software application running in the foreground and/or background on the device (110/105/120/125). Some or all of the controllers/components of the device (110/105/120/125) may be executable instructions that may be embedded in hardware or firmware in addition to, or instead of, software. In one embodiment, the device (110/105/120/125) may operate using an Android operating system (such as Android 4.3 Jelly Bean, Android 4.4 KitKat or the like), an Amazon operating system (such as FireOS or the like), or any other suitable operating system.

Computer instructions for operating each device (110/105/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/105/120/125) includes input/output device interfaces (1502/1602). A variety of components may be connected through the input/output device interfaces (1502/1602), as will be discussed further below. Additionally, each device (110/105/120/125) may include an address/data bus (1524/1624) for conveying data among components of the respective device. Each component within a device (110/105/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a loudspeaker 114, a wired headset or a wireless headset (not illustrated), or other component capable of outputting audio (e.g., producing sound). The audio output component may be integrated into a single device or may be separate. The device 110 may also include one or more audio capture component(s). For example, the device 110 may include one or more microphones 112 (e.g., a plurality of microphones in a microphone array), a wired headset or a wireless headset (not illustrated), and/or the like. The audio capture component(s) may be integrated into a single device or may be separate. If an array of microphones is included, approximate distance to a sound's point of origin may be determined by acoustic localization based on time and amplitude differences between sounds captured by different microphones of the array. The device 110 may additionally include a display (not illustrated) for displaying content and/or may further include a camera (not illustrated), although the disclosure is not limited thereto. In some examples, the microphones 112 and/or loudspeaker(s) 114 may be external to the device 110, although the disclosure is not limited thereto. The input/output device interfaces 1502 may include A/D converters (not illustrated) and/or D/A converters (not illustrated) without departing from the disclosure.

The input/output device interfaces 1502 may also include an interface for an external peripheral device connection such as universal serial bus (USB), FireWire, Thunderbolt, Ethernet port or other connection protocol that may connect to network(s) 199.

The input/output device interfaces 1502/1602 may be configured to operate with network(s) 199. For example, via antenna(s) 1514, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Thus, the devices (110/105/120/125) may be connected to the network(s) 199 through either wired or wireless connections.

The network(s) 199 may include a local or private network or may include a wide network (e.g., wide area network (WAN)), such as the internet. Through the network(s) 199, the system may be distributed across a networked environment. The I/O device interface (1502/1602) may also include communication components that allow data to be exchanged between devices such as different physical servers in a collection of servers or other components.

The components of the device 110 and/or the system(s) 105/120/125 may include their own dedicated processors, memory, and/or storage. Alternatively, one or more of the components of the device 110 and/or the system(s) 105/120/125 may utilize the I/O device interfaces (1502/1602), processor(s) (1504/1604), memory (1506/1606), and/or storage (1508/1608) of the device(s) 110 and/or the system(s) 105/120/125.

As noted above, multiple devices may be employed in a single system. In such a multi-device system, each of the devices may include different components for performing different aspects of the system's processing. The multiple devices may include overlapping components. The components of the device 110, the local SLU device 105, the remote system 120, and the skill system(s) 125, as described herein, are illustrative, and may be located as a stand-alone device or may be included, in whole or in part, as a component of a larger device or system.

As illustrated in FIG. 17, multiple devices (110a-110g, 105, 120, and/or 125) may contain components of the system and the devices may be connected over a network(s) 199. The network(s) 199 may include a local or private network or may include a wide network such as the Internet. Devices may be connected to the network(s) 199 through either wired or wireless connections. For example, a tablet computer 110a, a smart phone 110b, a smart watch 110c, speech-detection device(s) with a display 110d, speech-detection device(s) 110e, headless device(s) 110h, a smart television 110g, a local SLU device 105, the remote system 120, and/or the skill system(s) 125 may be connected to the network(s) 199 through a wired and/or wireless connection. For example, the devices 110 may be connected to the network(s) 199 via an Ethernet port, a wireless service provider, over a Wi-Fi or cellular network connection, and/or the like.

The concepts disclosed herein may be applied within a number of different devices and computer systems, including, for example, general-purpose computing systems, speech processing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media.

Embodiments of the present disclosure may be performed in different forms of software, firmware, and/or hardware. For example, an acoustic front end (AFE), may comprise, among other things, analog and/or digital filters (e.g., filters configured as firmware to a digital signal processor (DSP)). Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   sending first audio data to a loudspeaker;
   receiving, by a device, a first microphone signal associated with a first microphone and a second microphone signal associated with a second microphone;
   determining, using the first microphone signal, a first power estimate value corresponding to a first frequency range;
   determining, using the second microphone signal, a second power estimate value corresponding to the first frequency range;
   determining a first difference value between the first power estimate value and the second power estimate value;
   determining, using the first microphone signal, a third power estimate value corresponding to a second frequency range, the second frequency range different than the first frequency range;

determining, using the second microphone signal, a fourth power estimate value corresponding to the second frequency range;

determining a second difference value between the third power estimate value and the fourth power estimate value;

determining, using at least the first difference value and the second difference value, first classification data indicating a first type of microphone occlusion event; and determining, using the first classification data, that the first microphone is occluded.

2. The computer-implemented method of claim 1, further comprising:

generating, using the first microphone signal, a third microphone signal in a subband-domain;

generating, using the first audio data, second audio data in the subband-domain; and performing, using the third microphone signal and the second audio data, echo cancellation to generate a fourth microphone signal.

3. The computer-implemented method of claim 2, further comprising:

determining first power spectral density data corresponding to the third microphone signal;

determining second power spectral density data corresponding to the fourth microphone signal; and determining an echo return loss enhancement (ERLE) value by using the first power spectral density data and the second power spectral density data, wherein determining the first classification data further comprises determining the first classification data using at least the first difference value and the ERLE value.

4. The computer-implemented method of claim 1, further comprising:

disabling adaptive beamforming processing;

generating, using the second microphone signal, a third microphone signal; and causing speech processing to be performed using the third microphone signal.

5. The computer-implemented method of claim 1, further comprising:

causing speech processing to be performed using the second microphone signal.

6. The computer-implemented method of claim 1, further comprising:

receiving a third microphone signal associated with the first microphone and a fourth microphone signal associated with the second microphone;

determining, using the third microphone signal, a fifth power estimate value corresponding to the first frequency range;

determining, using the fourth microphone signal, a sixth power estimate value corresponding to the first frequency range;

determining a third difference value between the fifth power estimate value and the sixth power estimate value;

determining, using at least the third difference value, second classification data indicating a second type of microphone occlusion event;

determining, using the second classification data, that the first microphone and the second microphone are not occluded;

performing, using the third microphone signal and the fourth microphone signal, adaptive beamforming to generate directional audio data that includes a first audio signal corresponding to a first direction and a second audio signal corresponding to a second direction; and causing speech processing to be performed using the directional audio data.

7. The computer-implemented method of claim 1, further comprising:

receiving a third microphone signal associated with the first microphone and a fourth microphone signal associated with the second microphone;

determining, using the third microphone signal and the fourth microphone signal, second classification data indicating a second type of microphone occlusion event;

determining, using the second classification data, that the first microphone and the second microphone are not occluded;

generating, by a fixed beamformer component using the third microphone signal and the fourth microphone signal, first directional audio data, comprising:

a first audio signal corresponding to a first direction, and a second audio signal corresponding to a second direction;

generating a first output audio signal corresponding to the first direction by subtracting the second audio signal from the first audio signal; and causing speech processing to be performed using the first output audio signal.

8. The computer-implemented method of claim 7, wherein the first directional audio data includes a third audio signal corresponding to a third direction and a fourth audio signal corresponding to a fourth direction, and the method further comprises:

generating a second output audio signal corresponding to the third direction by subtracting the fourth audio signal from the third audio signal;

generating output audio data by combining the first output audio signal and the second output audio signal; and causing speech processing to be performed using the output audio data.

9. The computer-implemented method of claim 1, wherein determining that the first microphone is occluded further comprises:

determining, using the first classification data, a first confidence score indicating a likelihood that the first microphone is occluded; and determining, using the first confidence score, that the first microphone is occluded.

10. A system comprising:

at least one processor; and memory including instructions operable to be executed by the at least one processor to cause the system to:

send first audio data to a loudspeaker;

receive, by a device, a first microphone signal associated with a first microphone and a second microphone signal associated with a second microphone;

determine, using the first microphone signal, a first power estimate value corresponding to a first frequency range;

determine, using the second microphone signal, a second power estimate value corresponding to the first frequency range;

determine a first difference value between the first power estimate value and the second power estimate value;

determine, using at least the first difference value, first classification data indicating a first type of microphone occlusion event;

determine, using the first classification data, that the first microphone is occluded;

generate, using the second microphone signal, a third microphone signal in a subband-domain;

generate, using the first audio data, second audio data in the subband-domain; and perform, using the third microphone signal and the second audio data, echo cancellation to generate a fourth microphone signal.

11. The system of claim 10, wherein the memory further comprises instructions that, when executed by the at least one processor, further cause the system to:

determine, using the first microphone signal, a third power estimate value corresponding to a second frequency range, the second frequency range different than the first frequency range;

determine, using the second microphone signal, a fourth power estimate value corresponding to the second frequency range;

determine a second difference value between the third power estimate value and the fourth power estimate value; and determine the first classification data using at least the first difference value and the second difference value.

12. The system of claim 10, wherein the memory further comprises instructions that, when executed by the at least one processor, further cause the system to:

determine first power spectral density data corresponding to the third microphone signal;

determine second power spectral density data corresponding to the fourth microphone signal;

determine an echo return loss enhancement (ERLE) value by using the first power spectral density data and the second power spectral density data; and determine the first classification data using at least the first difference value and the ERLE value.

13. The system of claim 10, wherein the memory further comprises instructions that, when executed by the at least one processor, further cause the system to:

disable adaptive beamforming processing; and cause speech processing to be performed using the fourth microphone signal.

14. The system of claim 10, wherein the memory further comprises instructions that, when executed by the at least one processor, further cause the system to:

cause speech processing to be performed using the fourth microphone signal.

15. The system of claim 10, wherein the memory further comprises instructions that, when executed by the at least one processor, further cause the system to:

receive a fifth microphone signal associated with the first microphone and a sixth microphone signal associated with the second microphone;

determine, using the fifth microphone signal, a third power estimate value corresponding to the first frequency range;

determine, using the sixth microphone signal, a fourth power estimate value corresponding to the first frequency range;

determine a second difference value between the third power estimate value and the fourth power estimate value;

determine, using at least the second difference value, second classification data indicating a second type of microphone occlusion event;

determine, using the second classification data, that the first microphone and the second microphone are not occluded;

perform, using the fifth microphone signal and the sixth microphone signal, adaptive beamforming to generate directional audio data that includes a first audio signal corresponding to a first direction and a second audio signal corresponding to a second direction; and cause speech processing to be performed using the directional audio data.

16. The system of claim 10, wherein the memory further comprises instructions that, when executed by the at least one processor, further cause the system to:

receive a fifth microphone signal associated with the first microphone and a sixth microphone signal associated with the second microphone;

determine, using the fifth microphone signal and the sixth microphone signal, second classification data indicating a second type of microphone occlusion event;

determine, using the second classification data, that the first microphone and the second microphone are not occluded;

generate, by a fixed beamformer component using the fifth microphone signal and the sixth microphone signal, first directional audio data, comprising:

a first audio signal corresponding to a first direction, and a second audio signal corresponding to a second direction;

generate a first output audio signal corresponding to the first direction by subtracting the second audio signal from the first audio signal; and cause speech processing to be performed using the first output audio signal.

17. The system of claim 16, wherein the first directional audio data includes a third audio signal corresponding to a third direction and a fourth audio signal corresponding to a fourth direction, and the memory further comprises instructions that, when executed by the at least one processor, further cause the system to:

generate a second output audio signal corresponding to the third direction by subtracting the fourth audio signal from the third audio signal;

generate output audio data by combining the first output audio signal and the second output audio signal; and cause speech processing to be performed using the output audio data.

18. The system of claim 10, wherein the memory further comprises instructions that, when executed by the at least one processor, further cause the system to:

determine, using the first classification data, a first confidence score indicating a likelihood that the first microphone is occluded; and determine, using the first confidence score, that the first microphone is occluded.

* * * * *